United States Patent
Kato et al.

(10) Patent No.: US 8,072,889 B2
(45) Date of Patent: Dec. 6, 2011

(54) PROGRAMMABLE CONTROLLER

(75) Inventors: Satoshi Kato, Kariya (JP); Tsutomu Araki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 1350 days.

(21) Appl. No.: 11/658,612

(22) PCT Filed: Jul. 22, 2005

(86) PCT No.: PCT/JP2005/013904
§ 371 (c)(1),
(2), (4) Date: Jan. 26, 2007

(87) PCT Pub. No.: WO2006/011583
PCT Pub. Date: Feb. 2, 2006

(65) Prior Publication Data
US 2008/0082212 A1    Apr. 3, 2008

(30) Foreign Application Priority Data
Jul. 30, 2004   (JP) ................. 2004-222816

(51) Int. Cl.
*H04L 12/26* (2006.01)
(52) U.S. Cl. .................................... 370/241
(58) Field of Classification Search ........... 370/241, 370/217, 470, 471, 200; 607/4, 9, 23, 24, 607/25, 28, 17, 59
See application file for complete search history.

(56) References Cited

FOREIGN PATENT DOCUMENTS

| JP | 08-221116 | 8/1996 |
|----|-----------|--------|
| JP | 11-259101 | 9/1999 |
| JP | 2002-358106 | 12/2002 |
| JP | 2004-046348 | 2/2004 |
| JP | 2005-044074 | 2/2005 |

OTHER PUBLICATIONS

D. S. Sikora, et al. "Emergency Shutdown System", Record Conference Papers, The Institute of Electrical and Electronics Engineers, Sep. 11, 1989, XP 000077773, 6 pages.

*Primary Examiner* — Man Phan
*Assistant Examiner* — Nourali Mansoury
(74) *Attorney, Agent, or Firm* — Oblon, Spivak, McClelland, Maier & Neustadt, L.L.P.

(57) ABSTRACT

While a microcomputer is executing a self-diagnosis (A), second diagnosis pulse output means of a B-system microcomputer is not used utterly. Further, during this time, the B-system microcomputer 100B does not execute a processing relating to at least the self-diagnosis (A) utterly. By shifting the timings for the A-system and the B-system to output the diagnosis pulses, independencies can be secured between respective diagnosis processing (self-diagnoses (A) and (B)). Thus, the independencies between the A-system and the B-system can be verified briefly by the self-diagnosis (A) on the A-system side. Further, first diagnosis pulse group are outputted parallel and simultaneously from first diagnosis pulse output means. Thus, since cyclic control is not required for respective external input devices, it can be done to verify the independencies between the A-system and the B-system within a short period of time.

7 Claims, 17 Drawing Sheets

FIG. 1-A
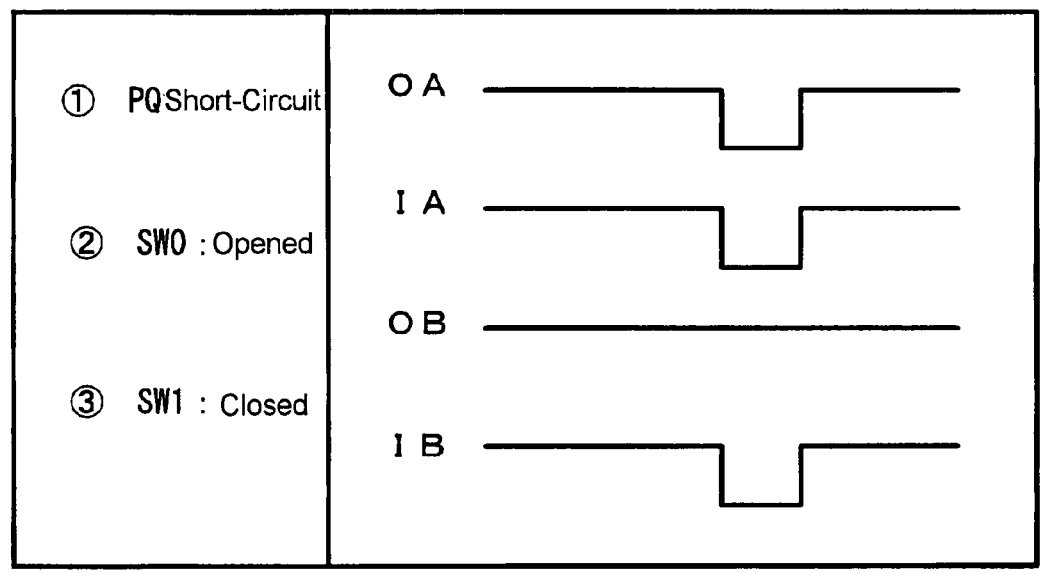
FIG. 1-B
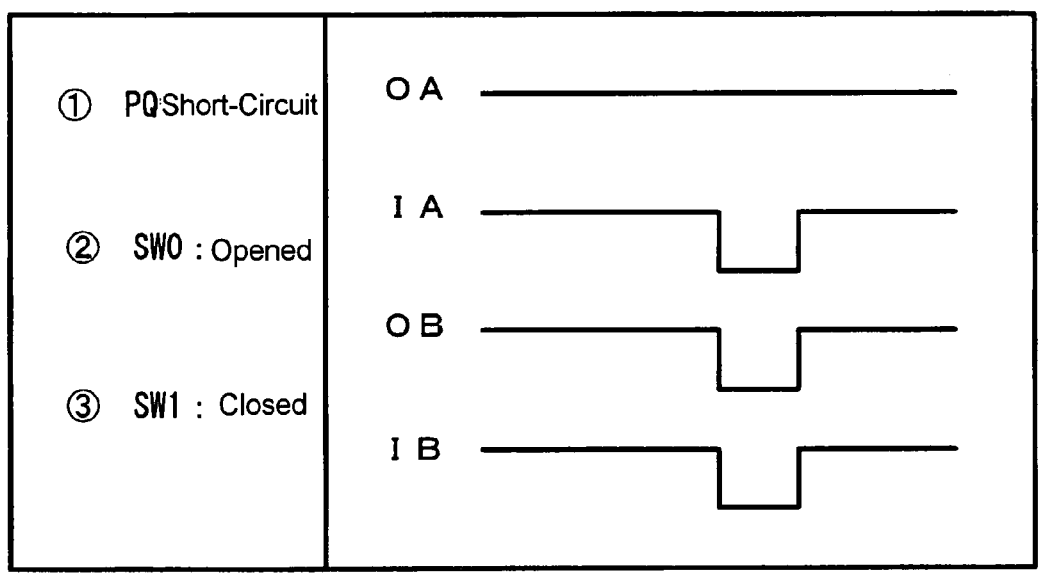

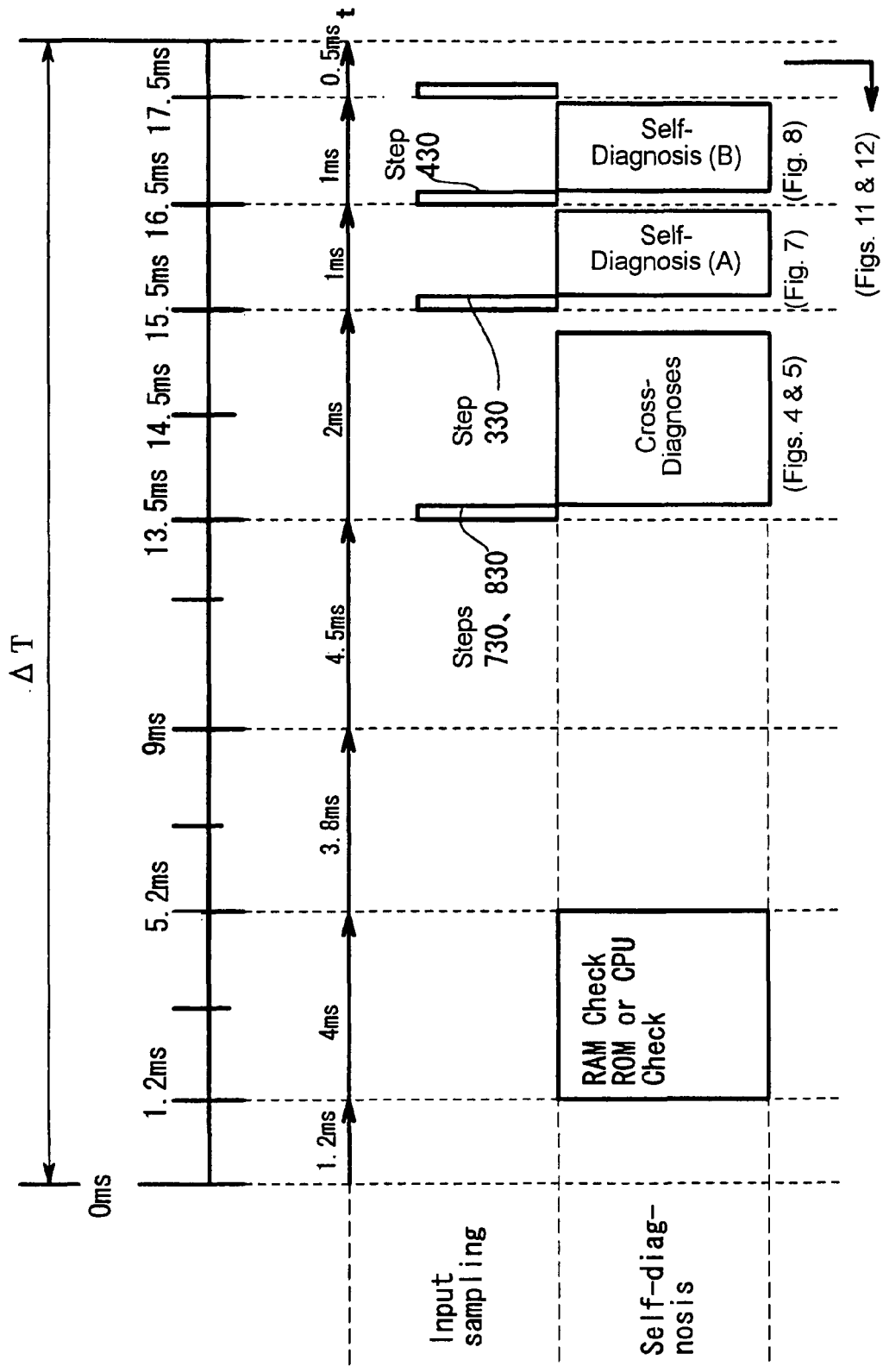

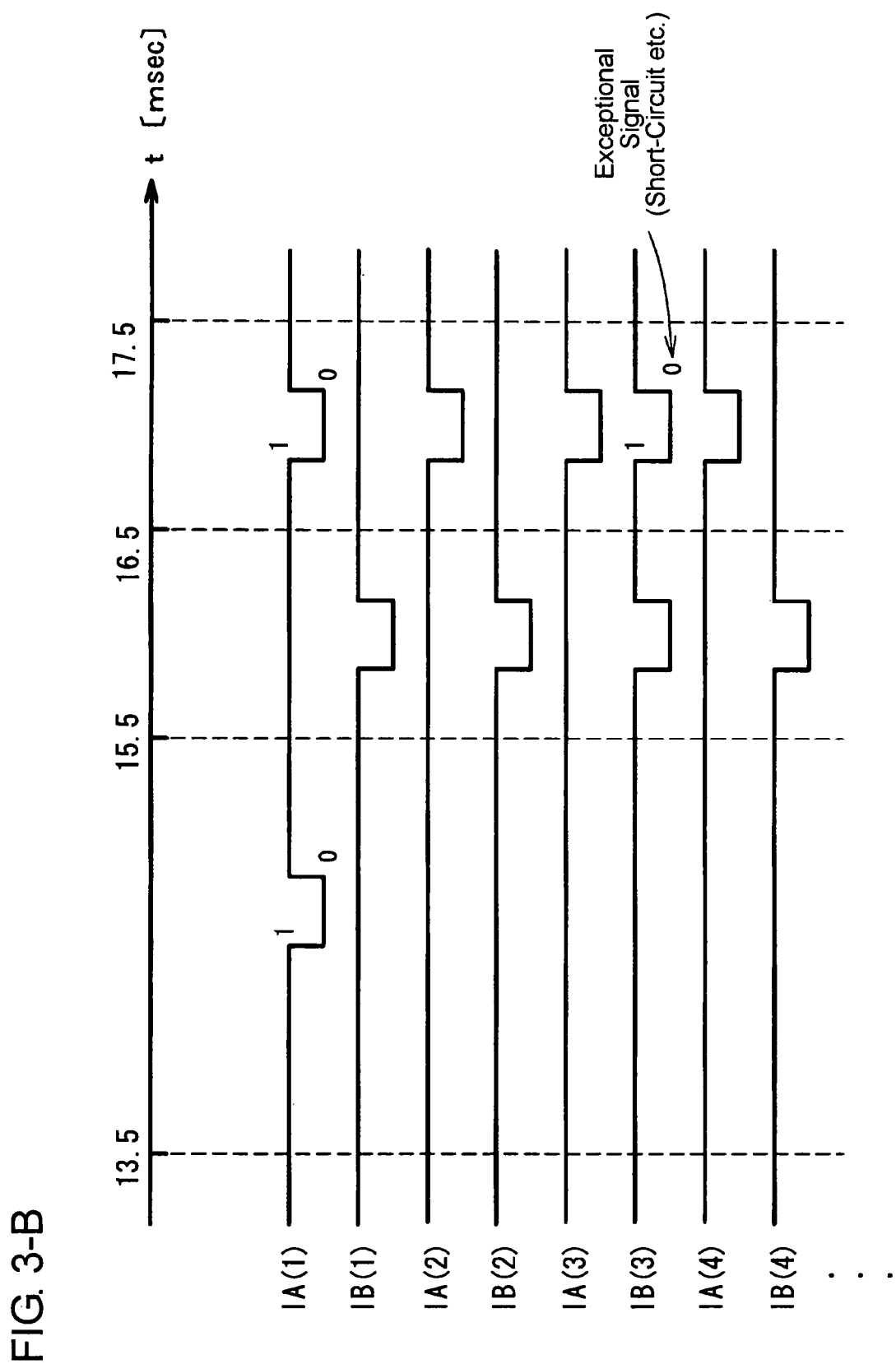

FIG. 6

| M \ N | 1 | 2 4 |
|---|---|---|
| 10 | (d)<br>10 Δ T = 0.18sec. | 240 Δ T = 4.32sec. |
| 100 | (b)<br>100 Δ T = 1.8sec. | (c)<br>2400 Δ T = 43.2sec. |

$$i = \begin{cases} 1 & (t = 13.5 \text{ [msec]}) \\ 2 & (t = 15.5 \text{ [msec]}) \\ 3 & (t = 17.5 \text{ [msec]}) \end{cases}$$

FIG. 15-A
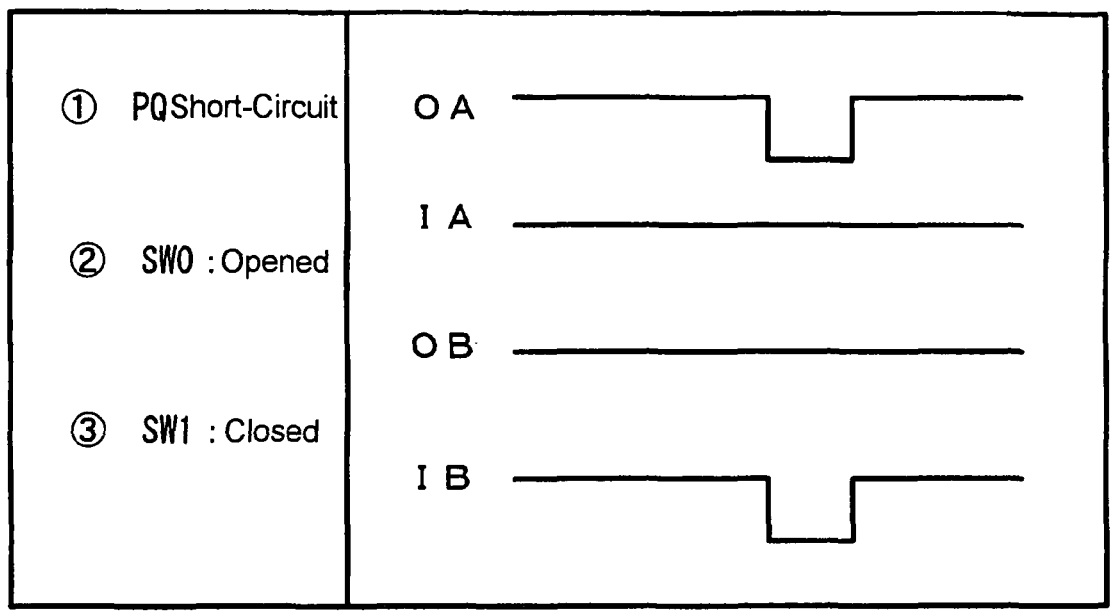
FIG. 15-B
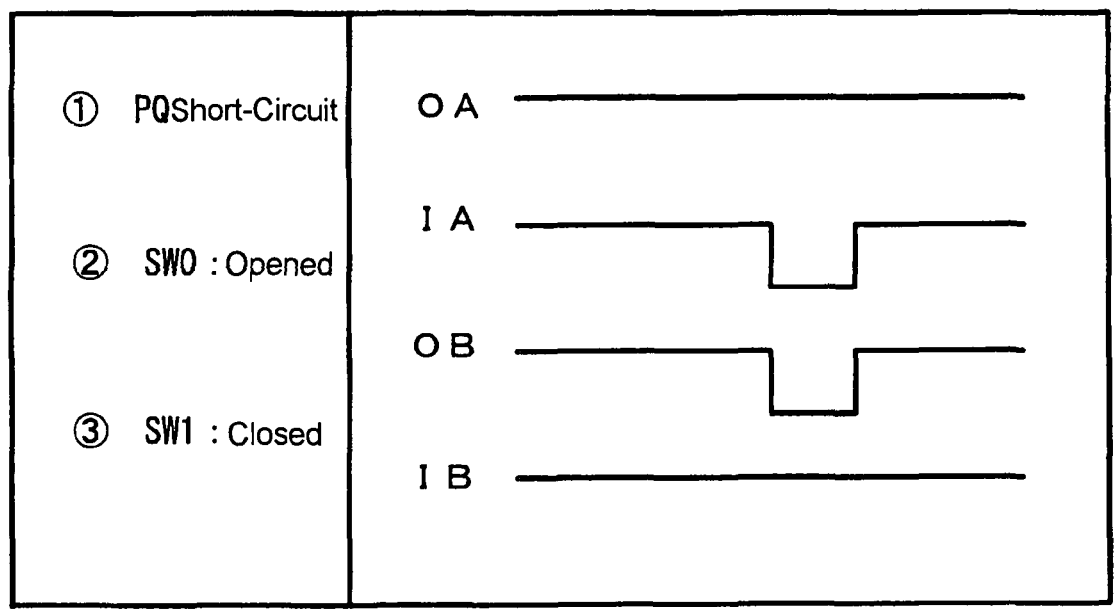

PROGRAMMABLE CONTROLLER

TECHNOLOGICAL FIELD

The present invention relates to a sequence control for the operations of a robot, a machine tool and peripheral devices therefor and particularly, is very useful in highly securing the reliability and safeness in the processing for input signals inputted to a programmable controller (PLC).

BACKGROUND ART

There is a system wherein a programmable controller performs the sequence control like that aforementioned above. In recent years, there is becoming widespread a PLC (so-called safety PLC) of an independent construction which is specialized for the safety management of the system in detecting the abnormality and the emergency state of the system as well as in automatically performing an emergency safety stop of the system. Patent Documents 1 and 2 noted below exemplify technologies relating to a so-called safety PLC like this.

As one of other technologies, FIG. 14 exemplifies a circuit diagram (in normal state) of a known input circuit 201 which is utilized in a programmable controller in the prior art. This input circuit 201 partly and briefly shows an input circuit in actual use. In the present circuit, switches SW1 and SW0 constituting an emergency stop switch are duplexed and are normally closed contacts. Photo couplers 10, 20, 30 and 40 are used in the operation state that electric current always flows therethrough. When the switches SW1, SW0 are brought into open states, the electric current flowing through the photo couplers 10, 20 and the electric current flowing through the photo couplers 30, 40 are cut off either. In this way, duplex constructions are provided by a circuit system for inputting and processing an input signal from the switch SW1 (the upper-half system of the illustrated input circuit 201 will be referred to occasionally as A-system) and by another circuit system for inputting and processing an input signal from the switch SW0 (the lower-half system of the illustrated input circuit 201 will be referred to occasionally as B-system).

Then, with the duplexed constructions, when the input signal detected in the A-system to indicate the open/close state of the switch SW1 coincides with the input signal detected in the B-system to indicate the open/close state of the switch SW0, the signals are treated as a normal input signal, and the subsequent logic processing is executed to control an output device. For example, when the depression of the emergency stop switch brings the contacts into open states, the two input signals outputted from the switches become signals both indicating the open states and come to coincidence, so that they are treated as a true input signal to execute an emergency stop processing for stopping the operations of all the output devices.

On the contrary, when the input signals from the switch SW1 and the switch SW0 of the two systems do not coincide, such is judged to be the occurrence of an abnormality, in which event an abnormality stop, that is, an emergency stop is performed to emergently stop all the output devices in a moment.

On one hand, the input circuits and the control devices therefor are always self-diagnosed. The method therefor will be described hereunder.

In FIG. 14, symbols (a), (b), (c) and (d) respectively denote inverters (logic reversers). When a diagnosis pulse OA (signal L in the figure) is outputted to the inverter (b) from an A-system control microcomputer (not shown) which controls the illustrated safety management, the electric potential at a diagnosis pulse input terminal 40a of the photo coupler 40 rises due to the reverse action of the inverter (b). Thus, since the emission of an LED built in the photo coupler 40 is discontinued temporarily for the period of the pulse (signal L) only, the normal current ($i_n$) flowing through the photo coupler 30 is once interrupted. As a consequence, a diagnosis result (response signal IB to the diagnosis pulse OA) which is inputted to a B-system control microcomputer (not shown) on the other side through the inverter (c) is temporally displaced from "1" to "0".

FIG. 15-A shows this relation. That is, FIG. 15-A shows the relation between the diagnosis pulse OA and the response signal IB at the time when the aforementioned diagnosis pulse OA (signal L in the figure) is outputted with the terminals P and Q being not short-circuited therebetween and with both of the switches Sw1 and SwO being closed. The same symmetrical relation holds at the time when a diagnosis pulse OB is sent from the B-system control microcomputer conversely. FIG. 15-B shows the relation between the diagnosis pulse OB and the aforementioned response signal IA in FIG. 14. These relations can be understood easily in terms of the symmetry of the circuit.

For example, the aforementioned diagnosis wherein a sender side of the diagnosis pulse and a receiver side of the response signal to the diagnosis pulse are constructed by the different computers in this way will be referred to as cross-diagnoses hereafter. In the cross-diagnoses like this, however, between the microcomputers, there may be provided communication means or diagnosis result sharing means of the configuration that enables the diagnosis pulse sender side to make reference immediately to the aforementioned response signal received on the receiver side.

By conducting the cross-diagnoses like this, it can be realized to always monitor the conductive states between respective terminals (O, P, Q, R) and the operational state of the circuit through the complimentary cooperation, so that the duplexing and steady monitoring of the input circuit can be attained. Further, by making the diagnosis pulses cross mutually between the different systems, there can also be obtained an advantage that the control microcomputer of the opposing system is always monitored for the normal operation.

In the prior art system, in the aforementioned manner, the input circuit 201 is duplexed by duplexing the transmission line for switch open/close signals, switches themselves and so on as shown in FIG. 14, whereby the safeness of the system can be ensured.

Patent Document 1 is Japanese unexamined, published patent application No. 2004-46348, and Patent Document 2 is Japanese unexamined, published patent application No. 2002-358106.

However, when a short-circuit occurs between the input terminals P and Q to the same input device whose input circuit 201 is duplexed as shown in FIG. 16, it results that the photo couplers for the A and B-systems are connected directly, whereby there is generated a short-circuit current (is) shown in the figure. This causes electric current to continuingly flow through the respective photo couplers 10, 20, 30, 40 regardless of the open/close states of the switches SW1, SW0. As a result, even when the emergency stop switches SW1, SW0 are brought into open states, each of the aforementioned switch open/close signals (IA, IB) remains to indicate the closed states without changing. That is, both of them are always held to remain at "1". As a consequence, the abnormality caused by the short-circuit like this cannot be detected even by the use of non-coincidence detection means which has been known for monitoring the non-coincidence between the response signals IA, IB duplexed as mentioned above.

When the duplexed switches are turned into the open states in the state that a short-circuit is taken place between input terminals for different input devices, the input signal to the system whose terminal has not been short-circuited is brought into the open state, while the input signal to the other system remains in the closed state. Thus, the duplexed signals are judged to be in non-coincidence, and an emergency stop processing is brought into operation immediately, so that no problem arises.

On the other hand, description will be described regarding the case that after the occurrence of the aforementioned short-circuit, the emergency stop switches SW1, SW0 are brought into the open states and then, the aforementioned cross-diagnoses are carried out. Actually, since the input circuit 201 as shown in FIG. 14 become needed by the number corresponding to the number of the devices to be controlled and peripheral devices therefor, the plurality of the input circuits 201 shown in FIG. 14 are arranged in parallel. In this case, the prior art safety PLC which is composed mainly of the aforementioned A-system control microcomputer and the B-system control microcomputer always monitors the safety of the system by repetitively executing the processing that the microcomputers read the states of respective input terminals at respective parts of plurality of the input circuits arranged in parallel in this way by cyclically outputting diagnosis pulses to each terminal.

In this case, since the circuit has been short-circuited, it results that electric current flowing through the short-circuited circuit in the other system is also interrupted by the diagnosis pulse, and this phenomenon can be detected by the change in level of the input signal. Accordingly, even when the non-coincidence detection circuit does not operate effectively, it becomes possible to detect the aforementioned short-circuit fault based on the cyclic diagnosis insofar as the cyclic diagnosis like this is always carried out.

However, since the cyclic diagnosis is carried out sequentially for the respective terminals, the diagnosis cycle at which the cyclic diagnosis is carried out is proportional to the number of objects to be diagnosed. Therefore, the cycle tends to become very long, as exemplificatively described later with reference to FIG. 6 and the like. Therefore, the present situation is that it is hard to say that a required time taken to detect the abnormality such as the aforementioned short-circuit can be shortened sufficiently.

Further, since the diagnosis cycle in the cyclic diagnosis is proportional to the number of the input terminals of the input circuits, it is likely that the problem like this will increasing become prominent and actual as the system becomes large in scale.

The present invention is made to solve the aforementioned problems, and the object thereof is to make it possible to perform a fault detection reliably and to perform an emergency stop more reliably and quickly.

DISCLOSURE OF THE INVENTION

The present inventions in the following various aspects are effective in solving the aforementioned problems.

That is, in a first aspect of the present invention, there is provided a programmable controller wherein a plurality of external input devices and a processing device for processing input signal group inputted from the external input devices are multiplexed by a plurality of systems and wherein upon coincidence between the input signal groups in all the systems, correct input signals are judged to have been inputted while upon non-coincidence therebetween, an abnormality stop processing is performed, wherein the processing device in one system comprises diagnosis pulse output means for parallel outputting diagnosis pulse group to the processing device in another system at a timing unique to the one system; check means for inputting thereinto diagnosis pulses outputted from diagnosis pulse output means in the another system and for interrupting the transmission of the input signal group for the period of the diagnosis pulses only; and abnormality judgment means for executing an abnormality stop processing when a signal (response signal) of the input signal group (response pattern) changes in response to the outputting of the diagnosis pulses from the diagnosis pulse output means in its own system.

Multiplexing in the first aspect of the present invention is arbitrary in number. It is the feature of the first aspect of the present invention that diagnosis pulses are parallel outputted from one system to another system and that the state of the input signal group to its own system which outputted the diagnosis pulses is judged with the transmission of input signal group to the another system being interrupted during the period of the diagnosis pulses only. Since the systems are independent of each other, input signal group to its own system which is not inputting the diagnosis pulses thereinto are not influenced by the diagnosis pulses unless any fault is not occurring. However, when a short-circuit of a certain kind is occurring between terminals, a circuit is formed, whereby a signal of the input signal group to its own system changes as a result of being influenced by the diagnosis pulses inputted to the another system. With this, any fault can be found in a moment to execute an emergency stop processing.

Generally, the input devices are supposed to comprise contacts of switches, relays and the like though not limited thereto in particular. Further, usually, it is often the case that these contacts are used as normally closed contacts. In this case, the input circuits are used with electric current being always applied, and when the switches are brought into open states, electric current flowing through the circuits is interrupted, the change of which is taken as a significant input signal.

In the first aspect of the present invention, diagnosis pulse groups are parallel outputted respectively at timings which are unique to each other between the respective systems, and if the independency of the individual system which independency is to be ensured for each of the parallel multiplexed systems has been loosen at this time due to a short-circuit or the like, a change is made of at least one signal, not to change normally, o the input signal group to its own system, and such a change is detected in its own system. Therefore, according to the first aspect of the present invention, it can be detected that the independency of at least its own system has been loosen. Thus, in the event that the independency of the individual system which independency is to be ensured for each of the respective multiplexed systems is loosen due to a short-circuit or the like, the aforementioned abnormality stop processing is executed, whereby a trouble caused by the short-circuit or the like can be obviated.

Further, in a second aspect of the present invention, a programmable controller is constructed to be duplexed by first input terminal group for inputting first input signal group which are outputted from external input device group each constructed to be duplexed; a first signal processing device for processing the first input signal group inputted to the first input terminal group; second input terminal group for inputting second input signal group outputted from the external input device group; and a second signal processing device for processing the second input signal group inputted to the second input terminal group, wherein a correct signal is judged to have been inputted when a first input signal being one element of the input signal group coincides with a second input signal paired with the first input signal while an abnormal processing is performed in the case of non-coincidence. The first signal processing device comprises first diagnosis pulse output means for parallel outputting first diagnosis pulse group to the second signal processing device; first check means for parallel inputting thereinto second diagnosis pulse group outputted from the second signal processing device and for interrupting the transmission of the first input signal group for the period of the second diagnosis pulse group only; and first abnormality judgment means for making a judgment of abnormality to execute an abnormality stop processing when the first input signal group change in response to the outputting of the first diagnosis pulse group from the first diagnosis pulse output means. The second signal processing device comprises second diagnosis pulse output means for parallel outputting the second diagnosis pulse group to the first check means at a timing which is different from the outputting of the first diagnosis pulse group; second check means for parallel inputting thereinto the first diagnosis pulse group outputted from the first diagnosis pulse output means and for interrupting the transmission of the second input signal group for the period of the first diagnosis pulse group only; and second abnormality judgment means for making the judgment of abnormality to execute the abnormality stop processing when the second input signal group change in response to the outputting of the second diagnosis pulse group from the second diagnosis pulse output means.

This invention in the second aspect is constructed to take two in the number of multiplexing. Respective systems take symmetrical circuit constructions. As is the same with the invention in the first aspect, the diagnosis pulses are outputted to the other system, and an abnormality judgment is executed by detecting the state of the input signal group in the system which parallel outputted the diagnosis pulses. Where a switch being an input device is brought into open state with the aforementioned short-circuit fault occurring and when the diagnosis pulses are inputted to interrupt electric current flowing through the circuit for the period of the diagnosis pulses, electric current flowing through the other circuit is also interrupted. By judging the state of the input signal group from the other circuit which is not inputting the diagnosis pulses thereinto, it can be realized to detect an abnormal state. In this detection, since the diagnosis pulses are parallel outputted to the input terminal group, it becomes possible to complete the abnormality diagnosis after the delay which is caused by the processing time of the input signal group subsequent to the output timing. Therefore, it becomes possible to perform an emergency stop without any delay after the change of an abnormality stop switch from the closed state to the open state. Strictly, the delay time at this occasion becomes a time which is taken only by the cycle time for the outputting of the diagnosis pulses, that is, becomes eighteen milliseconds or so for example.

Hereafter, the system in which the first signal processing device in the second aspect of the present invention controls the safety management may be occasionally referred to as A-system, whereas the other system in which the second signal processing device of the other controls the safety management may be occasionally referred to as B-system.

In the second aspect of the present invention, the first and second diagnosis pulse groups are parallel outputted at unique timings which are different from each other between the A-system and the B-system. Thus, if the independency of the individual system which independency is to be ensured for each of the parallel duplexed systems (i.e., the A-system and the B-system) has been loosen at this time due to a short-circuit or the like, at least one signal, not to change normally, of the input signal group to its own system may change in dependence on input conditions, and at this time, such a change is detected by its own system. Therefore, according to the second aspect of the present invention, it can be detected based on the first or second abnormality judgment means that the independency of at least its own system has been loosen. Thus, in the event that the independency of the individual system which independency is to be ensured for each of the respective duplexed systems is loosen due to short-circuit or the like, the aforementioned abnormality stop processing is executed, whereby a trouble caused by the short-circuit or the like can be obviated.

For example, a short-circuit instance shown in FIG. 16 as aforementioned can be recited as the case that the independencies of the systems have been loosen. In this case, the short-circuit has occurred between the terminals P and Q, and the short-circuit current ($i_s$) serially flows through the A-system circuit (photo couplers 10 and 20) and the B-system circuit (photo couplers 30 and 40), in the respect of which the independency between the A-system and the B-system has been loosen.

Further, at this time, under the condition that both of the switches SW1 and SW0 are being opened, the abnormal or emergency state can be detected based on the response pattern appearing at the time of sending the diagnosis pulses as shown in FIG. 1-A or 1-B. That is, it is safe to say that the detection operation for the short-circuit fault exemplified in FIG. 1-A or 1-B is the instance utilizing the operation of the present invention in the second aspect.

Further, a third aspect according to the present invention resides in the aforementioned first aspect, wherein the aforementioned abnormality judgment means judges an abnormality and performs an abnormality stop when a signal from the same input terminal of the input terminal group changes a predetermined number of times consecutively.

The reason of making judgment the predetermined number of times consecutively is for the measure against surrounding noise. A value is regarded correct if the same signal level is obtained the predetermined number of times consecutively, but is not regarded correct as a result of being regarded as surrounding noise if not obtained. Therefore, as the predetermined number of times increases, the anti-noise capability can be enhanced, but the time is elongated to reach the emergency stop. In this point of view, the predetermined number of times is properly set to, e.g., ten times or so.

Further, a fourth aspect according to the present invention resides in the aforementioned second aspect, wherein the aforementioned first abnormality judgment means is made as means for making the judgment of abnormality to perform an abnormality stop when a signal from the same input terminal of the first input signal group changes a predetermined number of times consecutively; and wherein the aforementioned second abnormality judgment means is made as means for making the judgment of abnormality to perform the abnormality stop when a signal from the same input terminal of the second input signal group changes a predetermined number of times consecutively.

The same as aforementioned in the third aspect according to the present invention is applied to the aforementioned predetermined number of times.

According to the third or fourth aspect of the present invention, when a signal from the same input terminal of the input signal group changes the predetermined number of times consecutively, such is judged to be abnormal. Thus, even where the job site has much surrounding noise which influences on the input signals, stable safety management can be realized without being influenced by such surrounding noise. The measure like this for control stability is effective particularly at a job site where there are many use of power machineries which generate such surrounding noise.

Further, a fifth aspect according to the present invention resides in the aforementioned first aspect, wherein the signal processing device in one system is provided with serial diagnosis pulse output means for serially outputting serial diagnosis pulses for each input terminal to the processing device in another system; and pulse check means for inputting serial diagnosis pulses which are outputted serially for each input terminal from serial pulse output means of the processing device in the another system and for making the judgment of abnormality to execute the abnormality stop processing when the input signals do not change in correspondence to the period of the serial diagnosis pulses.

Further, a sixth aspect according to the present invention resides in the aforementioned second aspect. The aforementioned first signal processing device is provided with first serial diagnosis pulse output means for serially outputting first serial diagnosis pulses to the second check means for each input terminal; and first pulse check means for inputting thereinto second serial diagnosis pulses which are serially outputted from the second signal processing device to the first check means for each input terminal and for making the judgment of abnormality to execute the abnormality stop processing when the first input signals do not change in correspondence to the period of the second serial diagnosis pulses. The second signal processing device is provided with second serial diagnosis pulse output means for serially outputting second serial diagnosis pulses to the first check means for each input terminal; and second pulse check means for inputting thereinto the first serial diagnosis pulses which are serially outputted from the first serial diagnosis pulse output means to the second check means for each input terminal and for making the judgment of abnormality to execute the abnormality stop processing when the second input signals do not change in correspondence to the period of the first serial diagnosis pulses.

According to any one of the aforementioned first to fourth aspects of the present invention, it is possible to verify the independencies between the individual systems. However, these verifications (diagnoses) do not enable the verifications (diagnoses) to be conducted up to on such faults as improper interferences and short-circuits which occur between individual circuits in the individual system.

However, according to the fifth or sixth aspect of the present invention, since the aforementioned serial diagnosis pulses are serially outputted to each input terminal, the verifications (diagnoses) can be conducted up to on such faults as improper interferences and short-circuits which occur between individual circuits in the individual system.

Further, a seventh aspect according to the present invention resides in the aforementioned first aspect wherein the aforementioned check means comprises a first photo coupler for inputting the input signal; and a second photo coupler composed of a photo transistor connected in series to a light emitting diode of the first photo coupler and a light emitting diode for generating an optical signal to the photo transistor of the second photo coupler upon receiving a diagnosis pulse.

Circuits such as photo couplers or the like for processing signals are used with electric current being supplied always, and when a switch is brought into open state, the electric current flowing through the circuit is interrupted, the change of which is used as a significant input signal.

Further, an eighth aspect according to the present invention resides in the aforementioned second aspect, wherein the aforementioned first check means comprises a first photo coupler for inputting the first input signal; and a second photo coupler composed of a photo transistor connected in series to a light emitting diode of the first photo coupler and a light emitting diode for generating an optical signal to the photo transistor of the second photo coupler upon receiving a second diagnosis pulse, and wherein the second check means comprises a third photo coupler for inputting the second input signal; and a fourth photo coupler composed of a photo transistor connected in series to a light emitting diode of the third photo coupler and a light emitting diode for generating an optical signal to the photo transistor of the fourth photo coupler upon receiving a first diagnosis pulse.

According to the seventh or eighth aspect of the present invention, the switching operations and the circuit interruption detection operations of the circuits in executing the diagnoses are executed by the photo couplers. Because these signals are transmitted in the form of lights with a predetermined wavelength, the following advantages can be obtained.

(1) It is possible to realize the switching operations and the circuit interruption detection operations of the circuits stably in the configuration that surrounding noise at the job site is hardly picked up directly.

(2) It becomes possible to limit the interfaces between the circuit group on the diagnosing side and the circuit group on the diagnosed side to optical interfaces only. Thus, independencies of the both circuit groups are enhanced, so that it becomes easy to carry out circuits designs such as, for example, power circuits individually independently of one another.

BRIEF DESCRIPTION OF THE DRAWINGS

FIG. 1-A is a graph (in the event of a short-circuit) exemplifying the relation between diagnosis pulses and response pulses;

FIG. 1-B is another graph (in the event of a short-circuit) exemplifying the relation between diagnosis pulses and response pulses;

FIG. 3-A is a time chart relating to the operations of respective processors (100A and 100B);

FIG. 3-B is a graph exemplifying response patterns (input patterns of respective response signals);

FIG. 6 is a calculation table for a diagnosis cycle (T) depending on the number (N) of measurements and the number (M) of terminals;

FIG. 15-A is a graph (in normal state) exemplifying the relation between diagnosis pulses and response pulses;

FIG. 15-B is another graph (in normal state) exemplifying the relation between diagnosis pulses and response pulses.

PREFERRED EMBODIMENT TO PRACTICE THE INVENTION

Hereafter, the present invention will be described by reference to specific embodiments.

However, the present invention is not limited to individual embodiments described hereunder.

First Embodiment

Figure 2:
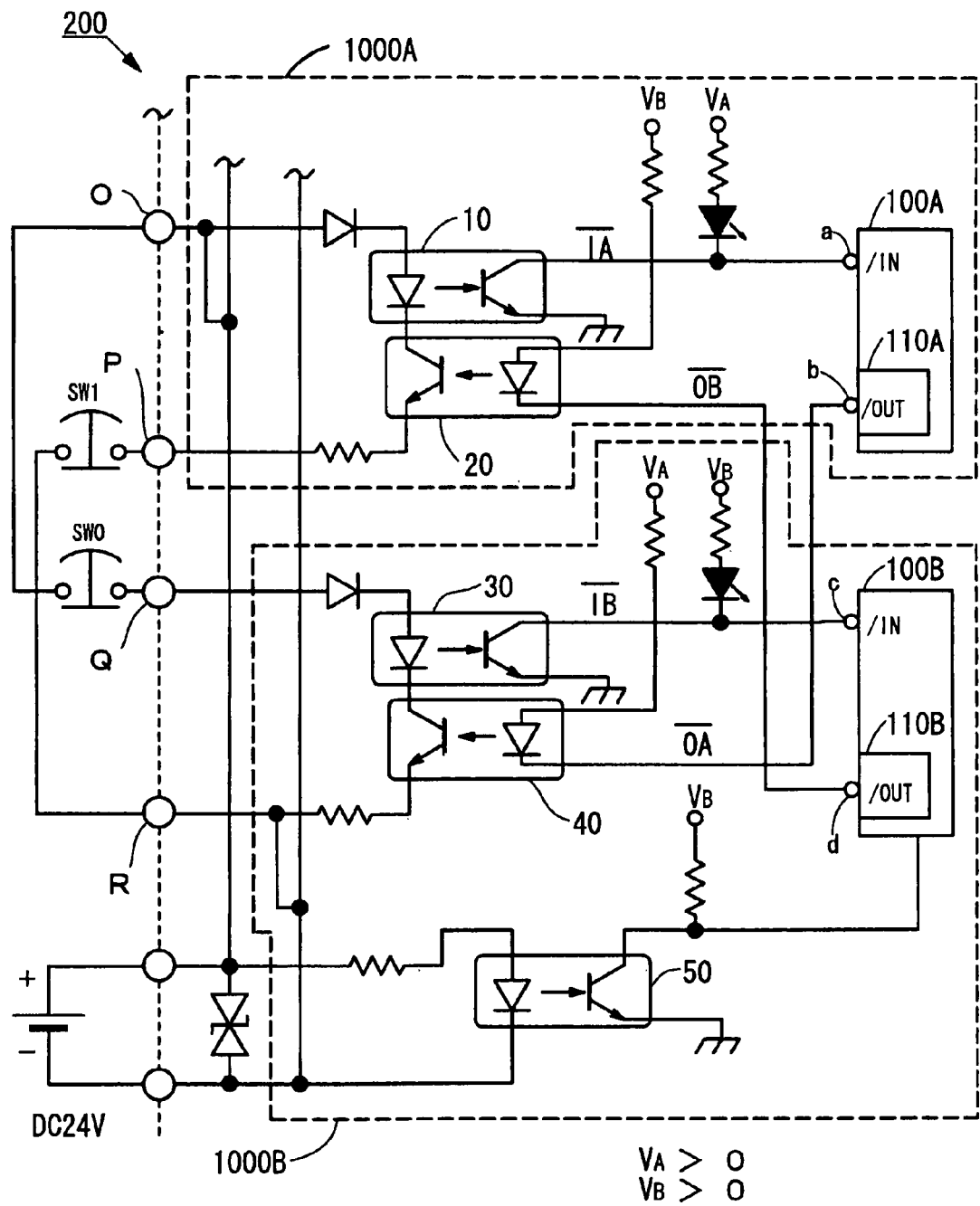
FIG. 2 is a circuit diagram of an input circuit 200 of a programmable controller in a first embodiment.

FIG. 2 shows an input circuit 200 of a programmable controller in the first embodiment. Input terminals O and P constitute first input terminals by these two terminals. Further, likewise, input terminals Q and R constitute second input terminals. Switches SW1 and SW0 are those duplexing a manual emergency stop button, and when the emergency stop button is pushed, both of the switches SW1 and SW0 are opened simultaneously. That is, when the emergency stop button is pushed, electrical connection is cut off both between the input terminals O, Q and between the input terminals P, R. The emergency stop button is one representing an external input device, and in fact, a plurality of other external input devices (not shown) are arranged and connected in the same manner as the emergency stop button in parallel relation with the emergency stop button. The external input devices are optional, and there are connectable contacts of various kinds such as, for example, switches, limit switches, relays, sensors and so on.

However, it is necessarily required to duplex input circuits for the external input devices which are little in a risk that the safety under the job site environment is endangered by the mulfunction of the devices as well as for external input devices which do not involve such a risk.

Hereafter, description will be made regarding the case that duplexing is provided in any of respective input circuits corresponding respectively to respective external input devices.

The input terminal O in FIG. 2 is constituted as a direct current power terminal of +24 volts. Further, the input terminal R is kept at the ground level (±0 volts). Then, since the switch SW1 in FIG. 2 is normally closed in the ordinary state, direct current voltage of stable 24 volts is normally applied to between the input terminals O and P in the ordinary state. Likewise, since the switch SW0 is also normally closed in the ordinary state, direct current voltage of stable 24 volts is normally applied also to between the input terminals Q and R in the ordinary state.

On the other hand, on the right side (on the side of the microcomputer 100A and the microcomputer 100B) of the boundaries which are made by optical interfaces of respective photo couplers, any circuit is constituted under a 5-volt power system. That is, any of the voltages $V_B$ and $V_A$ is set to +5 volts.

Always flowing normally in the ordinary state is electric current which flows from an LED provided in a photo coupler 10 in FIG. 2 to a photo transistor provided in a photo coupler 20. This is because in the ordinary state, electric current always flows through an LED provided in the photo coupler 20. Likewise, always flowing in the ordinary state is electric current which flows from an LED provided in a photo coupler 30 in FIG. 2 to a photo transistor provided in a photo coupler 40. This is because in the ordinary state, electric current always flows through an LED provided in the photo coupler 40.

Because in the same manner as the aforementioned emergency stop button, the aforementioned plurality of external input devices (not shown) are connected in parallel to the aforementioned emergency stop button, the first input terminals make a group. Hereafter, the group is referred to as first input terminal group. Further, a second input terminal group including the aforementioned second input terminals is defined likewise. Input signals outputted from respective external input devices and inputted to the first input terminal group will hereafter be referred to as first input signal group. Further, input signals outputted from the respective external input devices and inputted to the second input terminal group will hereafter be referred to as second input signal group.

The input circuit 200 in FIG. 2 has the first input terminals (O, P) and a first signal processing device 1000A, which constitute an upper-half system. Hereafter, this system will be referred to as A-system. Further, the input circuit 200 has the second input terminals (Q, R) and a second signal processing device 1000B, which constitute a lower-half system. Hereafter, this system will be referred to as B-system.

A logic reverser (inverter (a)) is arranged at an input section of an A-system control microcomputer 100A which controls the safety management for the A-system. Accordingly, a signal outputted from the photo coupler 10 and inputted to the microcomputer 100A through the inverter (a) is inverted in the level of H/L (i.e., "1"/"0") before and after the inverter (a). Other inverters (b), (c) and (d) perform the same reverse function.

First diagnosis pulse output means 110A is arranged at an output section of the microcomputer 100A. The first diagnosis pulse output means 110A is capable of simultaneously and parallel outputting diagnosis pulses to photo couplers (not shown) of other external input devices being in parallel connection as well as to the photo coupler 40. Of course, in the same manner as done by the prior art system, it is possible to output diagnosis pulses to the separate external input devices serially in turn and individually.

On the other hand, a microcomputer 100B is the B-system control microcomputer which controls the safety management for the B-system, and is constructed and arranged in the same manner as the aforementioned microcomputer 100A and symmetrically with the aforementioned microcomputer 100A, except for the respect that there is additionally provided a diagnosis circuit which is composed mainly of a photo coupler 50 for direct current power supply diagnosis.

For example, second diagnosis pulse output means 110B is arranged at an output section of the microcomputer 100B, and the second diagnosis pulse output means 110B is capable of simultaneously and parallel outputting diagnosis pulses to photo couplers (not shown) of the aforementioned other external input devices being in parallel connection as well as to the photo coupler 20. Of course, in the same manner as done by the prior art system, it is possible to output diagnosis pulses to photo couplers (check means) corresponding to the separate external input devices, serially in turn and individually.

The photo couplers 10 and 20 constitute the part corresponding to first check means in the present invention. Since the pair of photo couplers like these are arranged respectively in each of the input circuits of the A-system which correspond to the respective input devices, so that it becomes possible to interrupt the transmission of the first input signal group momentarily. Further, likewise, the photo couplers 30 and 40 constitute the part corresponding to second check means in the present invention. Thus, it becomes possible to interrupt the transmission of the second input signal group momentarily.

That is, it is the diagnosis pulses that control the interruption, and where the parallel (simultaneous) transmissions are made as aforementioned, it is possible in each case to simultaneously interrupt the first input signals by the first diagnosis pulse output means 110A and the second input signals by the second diagnosis pulse output means 110B.

FIG. 3-A exemplifies a time chart relating to the operation of each of the aforementioned microcomputers (100A and 100B). The base control cycle $\Delta T$ of the microcomputer 100A, 100B is set to 18 milliseconds. Those times illustrated represent respective times (t) within the control cycle which are set on the basis of a start time of the control cycle. For example, the illustrated cross-diagnoses are executed in a time zone which is a part between 13.5 milliseconds and 15.5 milliseconds of the time (t) within the control cycle. Both of the microcomputers 100A and 100B are used for the cross-diagnoses.

Further, the microcomputer 100A only is used for a self-diagnosis (A) executed in a time zone which is a part between 15.5 milliseconds and 16.5 milliseconds of the time (t) within the control cycle. Further, the microcomputer 100B only is used for a self-diagnosis (B) executed in a time zone which is a part between 16.5 milliseconds and 17.5 milliseconds of the time (t) within the control cycle.

Cross-Diagnoses

FIG. 3-B exemplifies response patterns (input patterns of respective response signals IA(m) and IB(m)) corresponding to the diagnosis pulses. Here, the natural number (m) is a serial number which is allotted to each external input device in consecutive order, and hereafter, in the present embodiment, the maximum value of (m) is assumed to be 24.

Figure 14:
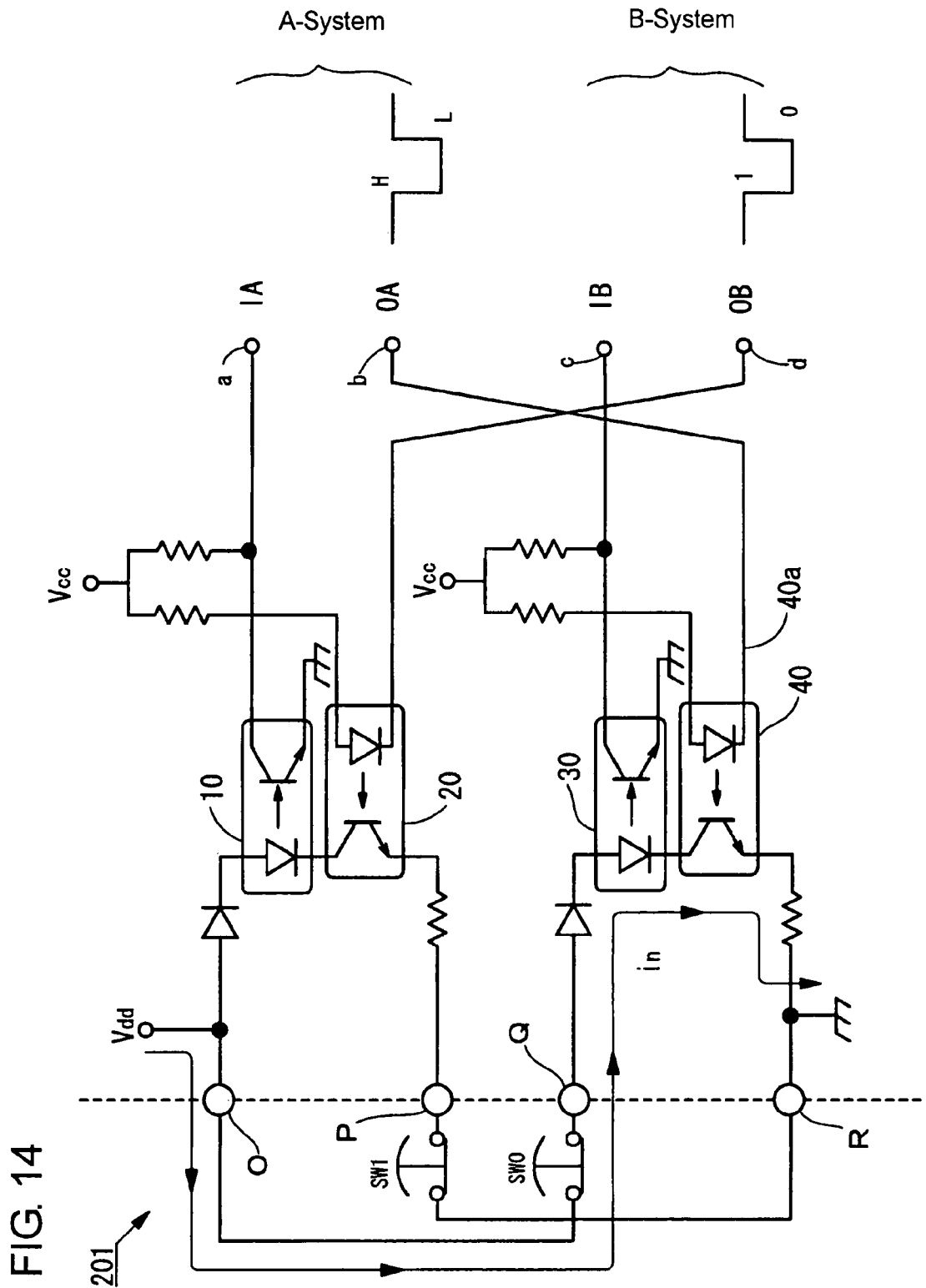
FIG. 14 is a circuit diagram (in normal state) of a prior art input circuit 201.
Figure 16:
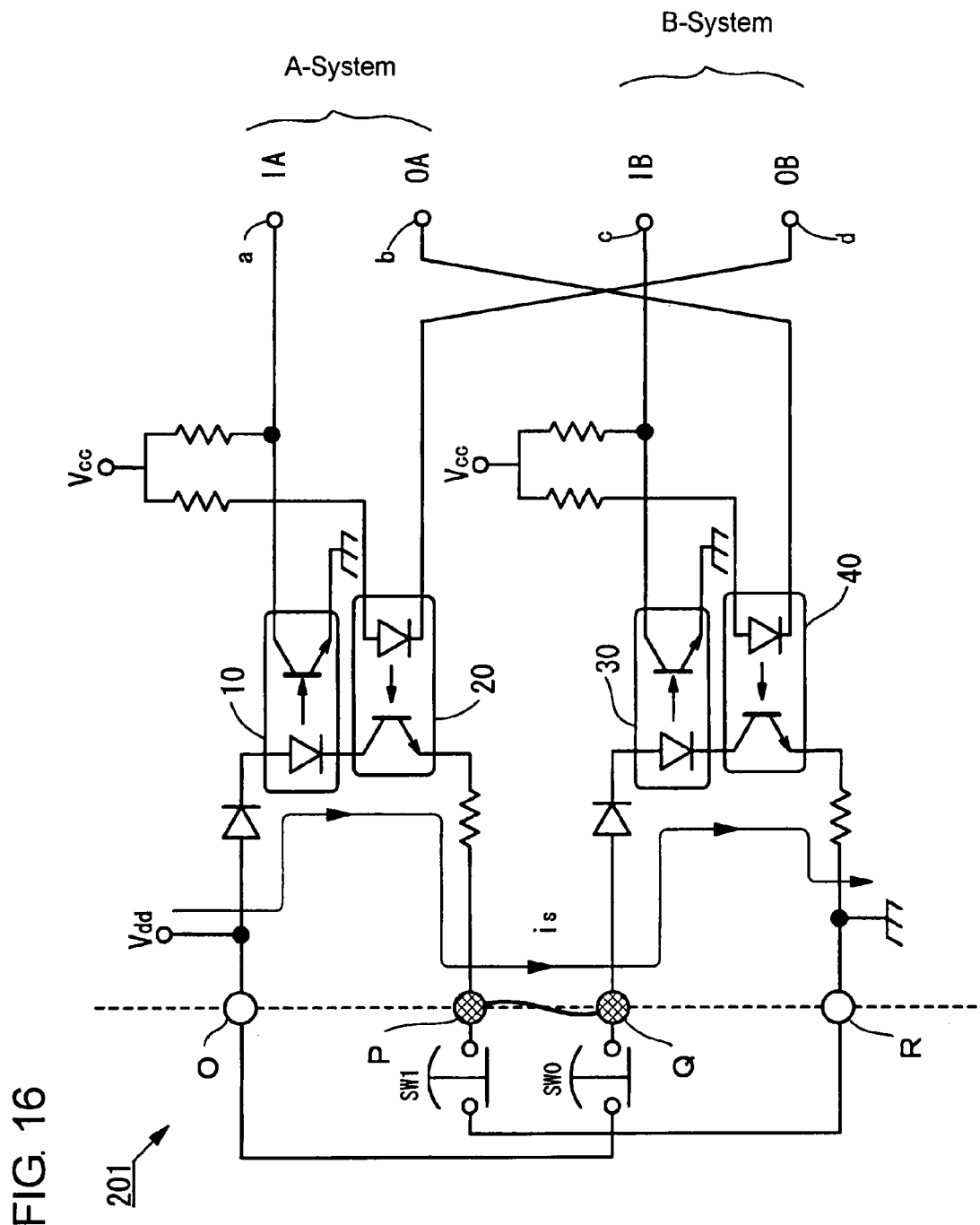
FIG. 16 is a circuit diagram (in the event of a short-circuit) of the prior art input circuit 201.

In the self-diagnosis B, the response signal IA(m) ($1 \leq m \leq 24$) inputted to the A-system microcomputer 100A ought to change based on the diagnosis pulse OB(m) ($1 \leq m \leq 24$) which is outputted from the second diagnosis pulse output means 110B, provided in the B-system microcomputer 100B, to the first check means in parallel with other diagnosis pulses. However, at this time, if the independencies of the A and B-systems in the input circuit 200 have been secured and maintained, no change ought to be made with the response signal IB(m) ($1 \leq m \leq 24$) inputted into the B-system microcomputer 100B, as already considered earlier with reference to FIG. 14 and FIG. 15-B.

Accordingly, when an exceptional signal exemplified in FIG. 3-B is detected, it is considered that there has occurred an abnormal situation as referred to earlier with reference to FIG. 1-B.

Hereafter, detail exemplification will be made regarding the control procedures which the microcomputers 100A and 100B should execute to detect such an abnormality.

Figure 4:
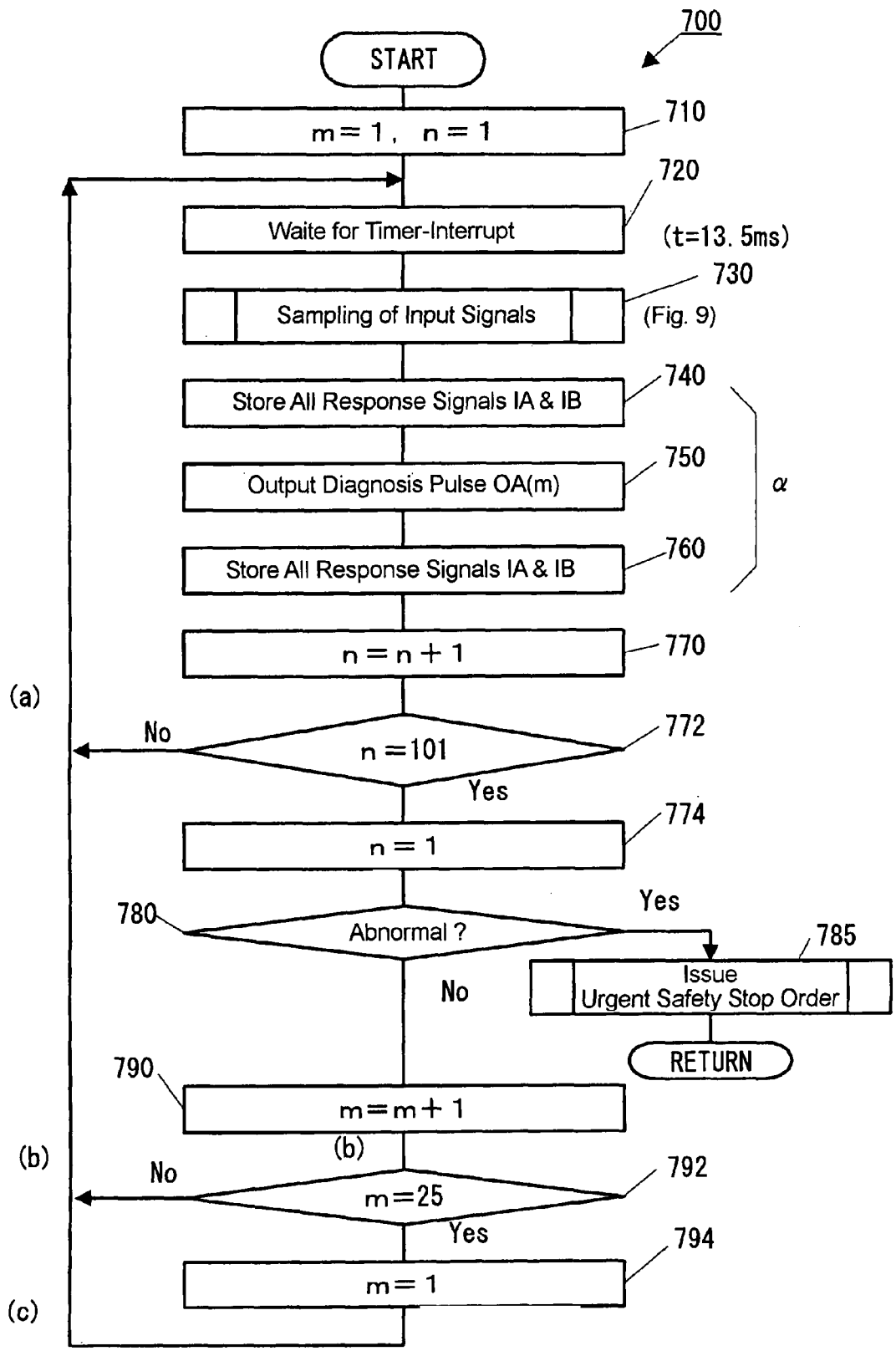
FIG. 4 is a flow chart for cross-diagnosis (A-system) executed by a microcomputer 100A.

FIG. 4 exemplifies a flow chart of the cross-diagnosis (A-system) executed by the microcomputer 100A. This cross-diagnosis embodies the present invention in the sixth aspect, by which the cross-diagnoses in FIG. 3-A are realized. That is, the diagnosis pulse OA(m) in this figure is a diagnosis pulse for diagnosing the A-system input circuit of the m-th external input device as described above, and is outputted to the second check means. In the cross-diagnosis in FIG. 4, this output is carried out serially to the respective external input devices. This program 700 is analogous to a program 800 in FIG. 5 for executing the cross-diagnosis (B-system) and is configured symmetrically and complementarily therewith. The cross-diagnoses in FIG. 3-A are realized in accordance with the program 700 and the program 800.

Under this program 700, first of all, the initialization of control variables is executed at step 710. A control variable (m) always indicates the serial number of an external input device to be diagnosed. Further, a control variable (n) indicates the number of times through which the same diagnosis operation is repeated with the input circuit (A-system) of the same external input device.

At next step 720, a timer-interrupt is waited. This timing suffices to be the timing of t=13.5 [milliseconds], as shown in FIG. 3-A. That is, a subroutine at step 730 is executed at this timing, whereby a sampling processing in FIG. 9 for the input signals is initiated. The sampling processing for the input signals is to determine the signals (first input signal group and second input signal group) inputted to the input circuit 200, through a predetermined statistical operation. Although the procedure for the statistical operation will be described later in detail, the statistical operation is executed for the countermeasures mainly against disturbances such as noises or the like. However, the effect is not necessarily limited only to the countermeasures against disturbances.

A response signal IB(i) held on the microcomputer 100B side can be referred to at any time from the microcomputer 100A side by way of a bus, a shared memory or the like between the both microcomputers. Thus, at step 740, the response signals IA(i) ($1 \leq i \leq 24$) inputted to the microcomputer 100A are all (24 bits) stored in predetermined evacuation areas, and the response signals IB(i) ($1 \leq i \leq 24$) inputted to the microcomputer 100B are also all (24 bits) stored in predetermined evacuation areas.

The diagnosis pulses OA(i) and the diagnosis pulses OB(i) have not earlier been issued at this timing. Thus, at a later step 780, if it is confirmed that the response signals IA(i) ($1 \leq i \leq 24$) are "1" at all the bits, it can be judged that these input bits (the first input signal group) are normal. Further, the same is true with the second input signal group (responsive signals IB(i)).

At step 750, a diagnosis pulse OA(m) is outputted to the B-system check means of the m-th external input device. Since at step 850, corresponding to the step 750, of the program 800 in FIG. 5 which is configured to be analogous and symmetrical with the present program 700, a diagnosis pulse OB(m) is outputted at almost the same time to the A-system check means of the m-th external input device, the aforementioned cross-diagnoses can be realized based on the cross-relation of these diagnosis pulses. However, in a strict sense, the respective pulses OA(m) and OB(m) are outputted at mutually exclusive timings, as referred to later.

At step 760, the same processing as the aforementioned step 740 is executed. However, of course, the evacuation areas for input data are provided separately. It is possible to execute the abnormality judgment at step 780 based on diagnosis data for one-hundred times which have been stored respectively in these evacuation areas.

A series of processing ($\alpha$) composed of three steps from step 740 to step 760 and a series of processing ($\beta$) composed of three steps from step 840 to step 860 in FIG. 5 referred to later are executed at different timings and mutually exclusively. The synchronization for executing this exclusive control may be realized by making the microcomputers 100A and 100B apply interrupts in turn to each other.

Further, steps 770 through 774 are the steps of realizing the control in which the aforementioned storage processing of the input data are repetitively executed through one-hundred times.

At step 780, it is judged whether or not abnormality is involved in the A-system input circuit of the m-th external input device. Where the abnormality is detected here based on the aforementioned diagnosis data, a subroutine for the issuance of an emergency safety stop order is called up at step 785, whereupon all the processing of the present program 700 are terminated to return the control to the caller.

Steps 790 through 794 are for executing a repetitive control which realizes cyclic processing for the external input devices to which twenty-four units in total are connected.

Figure 5:
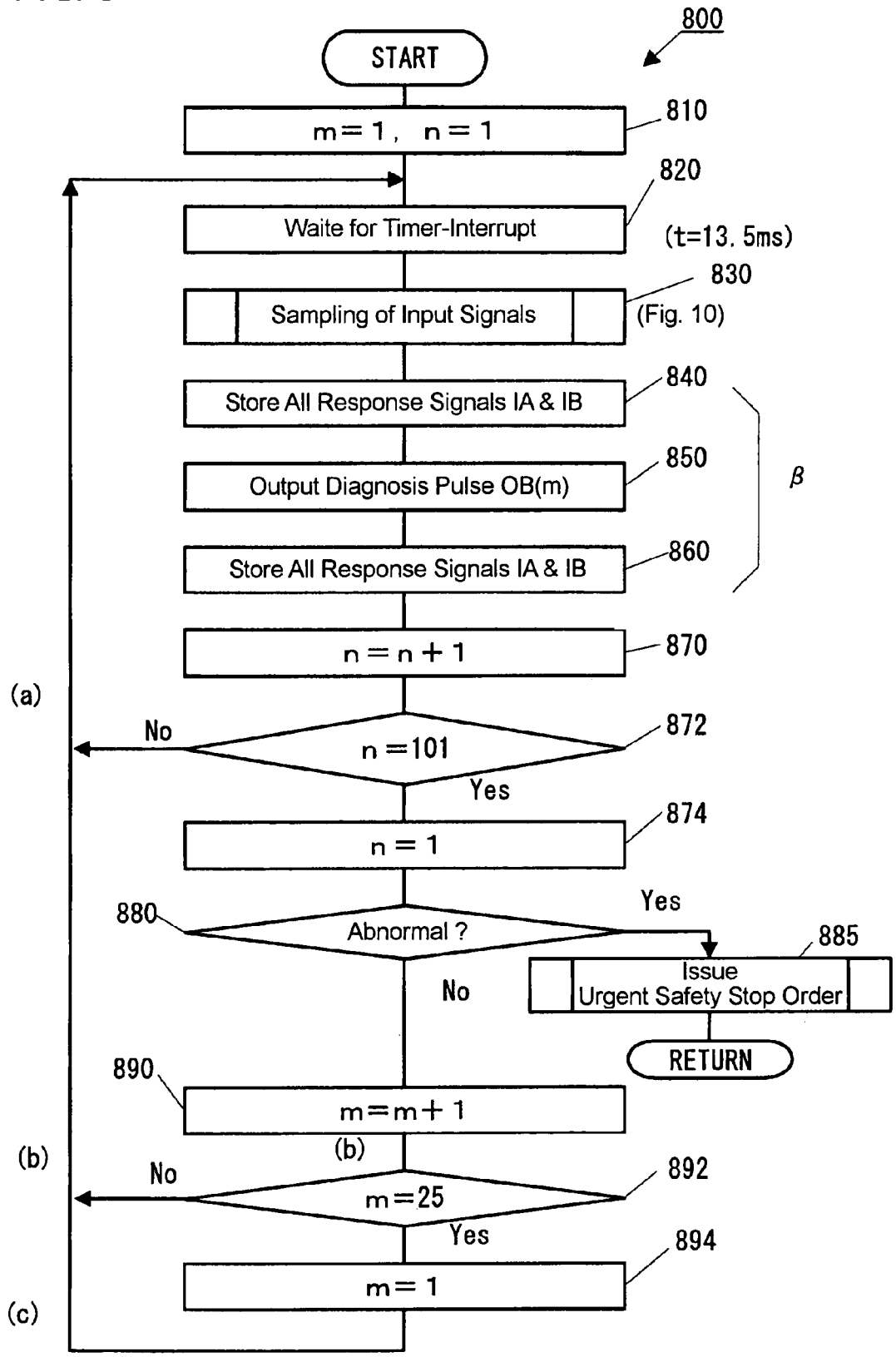
FIG. 5 is a flow chart for cross-diagnosis (B-system) executed by a microcomputer 100B.

Also under the program 800 in FIG. 5, the equivalent processing for the B-system is executed in a parallel time relation in the same manner as that under the aforementioned program 700. Then, by mutually crossing the diagnosis pulses between the different systems in this manner (that is, by alternately executing the aforementioned processing (α) and (β) as the same are controlled exclusively with each other), there can be obtained at the same time an advantage that the microcomputer for the control of the opposing system is always monitored about whether to be normal in operation or not.

As understood also from FIG. 3-A, the base control cycle in which the interrupt waiting at each of the steps 720 and 820 in FIGS. 4 and 5 is released is $\Delta T=18$ milliseconds. Therefore, the cycle at which the cyclic control passes through the respective cyclic points (a) shown in FIGS. 4 and 5 becomes 18 milliseconds too. Further, since the cross-diagnoses of one external input device are executed one-hundred times as mentioned earlier, the cycle at which the cyclic control passes through the respective cyclic points (b) shown in FIGS. 4 and 5 becomes $100\Delta T=1800$ milliseconds. Further, since the external input devices of twenty-four units in total are in connection in the present embodiment, the cycle at which the cyclic control passes through the respective cyclic points (c) shown in FIGS. 4 and 5 becomes $24 \times 100\Delta T=43.2$ seconds.

FIG. 6 shows the summary of these relations. That is, FIG. 6 shows the calculation of the diagnosis cycle (T) necessary for the aforementioned cross-diagnoses which cycle depends on the number N of measurements and the number M of terminals (the number of the total units of the external input devices). The aforementioned cross-diagnoses executed in accordance with the programs 700 and 800 tend to be elongated in the diagnosis cycle (T) though they are excellent in the minuteness regarding the states of individual input terminals. For this reason, it is not always possible that detections regarding the occurrences of short-circuit fault, emergency situation and the like can be executed necessarily within a sufficiently short period of time.

However, in the first embodiment, as shown in FIG. 3-A, the self-diagnosis (A) and the self-diagnosis (B) for verifying the independencies of the respective systems (A-system and B-system) in the parallel duplexed configuration can be executed each within a short period of time, so that it can be realized to reliably detect the short-circuit fault and the emergency situation as exemplified in FIGS. 1-A and 1-B, in a shorter diagnosis cycle than before.

Self-Diagnosis

Figure 7:
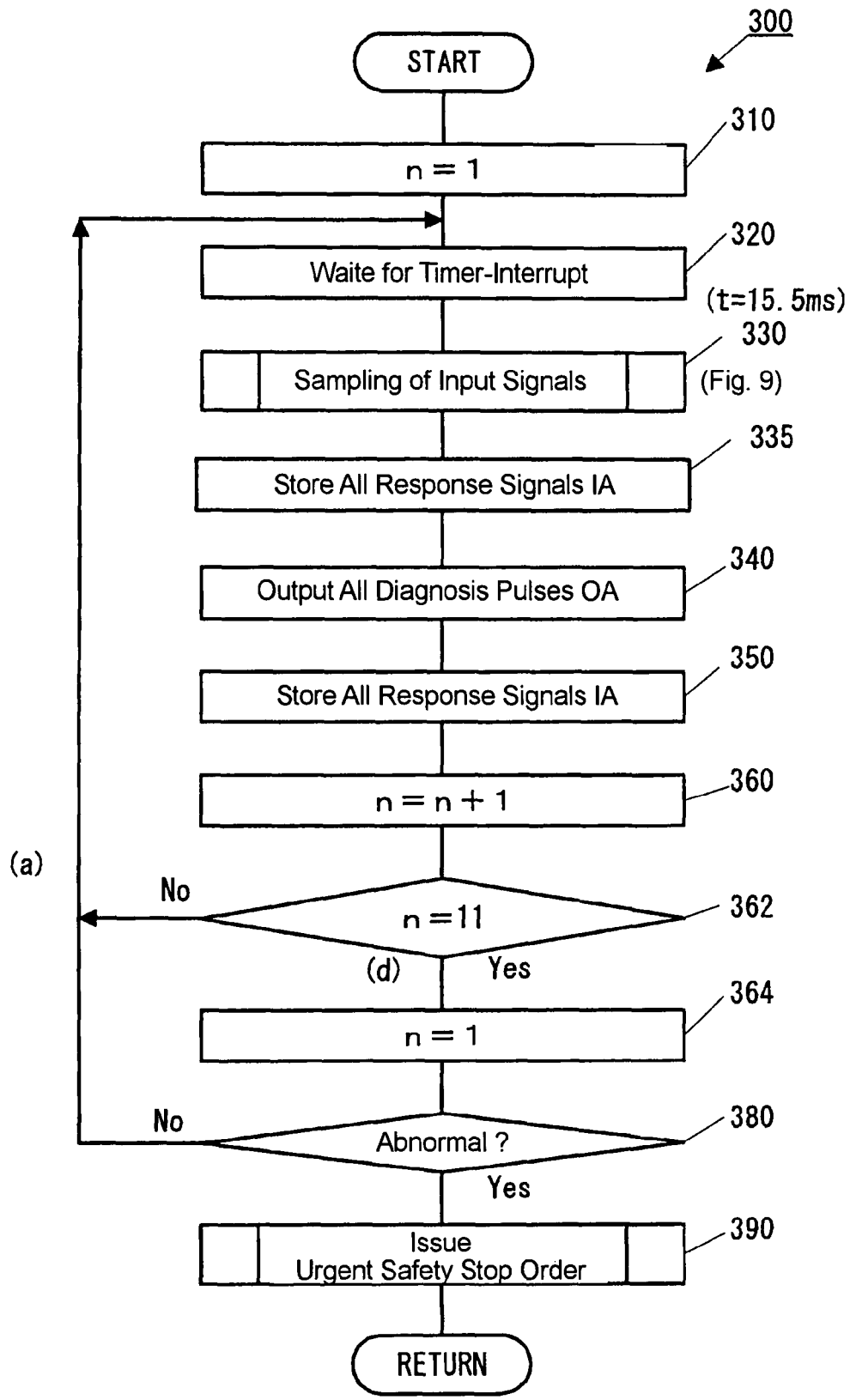
FIG. 7 is a flow chart exemplifying the procedure for a self-diagnosis (A) executed by the microcomputer 100A.

FIG. 7 exemplifies the procedure for the self-diagnosis (A) executed by the microcomputer 100A. The procedure of the self-diagnosis (A) exemplified by this flow chart is somewhat similar to the procedure for the cross-diagnosis (A-system), but is substantially completely different from the cross-diagnosis (A-system) in the following two respects (1) and (2).

(1) While the microcomputer 100A is executing the processing for the self-diagnosis (A) shown in FIG. 7, the second diagnosis pulse output means 110B of the B-system microcomputer 100B is not used utterly. Further, the B-system microcomputer 100B does not utterly execute the processing relating to at least the processing for the self-diagnosis (A) shown in FIG. 7 and is basically to be placed in the state waiting for an interrupt. However, the microcomputer 100B may be allowed to execute a statistical processing for input signals, response signals and so on as its background processing.

Accordingly, the independencies of the diagnosis processing can be secured by shifting the output timings of the diagnosis pulses between the program 300 (FIG. 7) and the program 400 (FIG. 8) in this way. That is, the cross-diagnoses wherein diagnosis pulses are mutually crossed between the different systems are not executed in the self-diagnosis (A) in FIG. 7.

For this reason, it can be realized to briefly verify the independencies of the A and B-systems on the A-system side.

(2) The first diagnosis pulse group are outputted by the first diagnosis pulse output means 110A simultaneously in parallel relation. Thus, cyclic control is unnecessary for the respective external input devices.

For this reason, it can be realized to verify the independencies of the A and B-systems on the A-system side in a short period of time.

Specifically, the following processing is executed in accordance with the program 300 (self-diagnosis (A)) in FIG. 7.

That is, under the program 300, first of all, a control variable is initialized at step 310. This control variable (n) indicates the number of times by which the diagnoses pulses are outputted.

A timer-interrupt is waited at next step 320. This timing suffices to be the timing of $t=15.5$ [milliseconds] as shown in FIG. 3-A. That is, a subroutine at step 330 is executed at this timing, whereby there is initiated an input signal sampling processing in FIG. 9 described later in detail. The input signal sampling processing is to determine the signals (first input signal group and second input signal group) inputted to the input circuit 200, through a predetermined statistical operation which mainly takes a non-coincidence detection processing.

Step 335 is for executing the same processing as the aforementioned step 740. Of course, the evacuation areas for the input data are provided separately. The A-system response signals IA are all (twenty-four bits in total) stored at step 335 here and subsequent step 350. In addition, at the same time, the B-system response signals IB may be also all stored like the aforementioned step 740 or 760 in FIG. 4.

Then, an abnormality judgment at step 380 is carried out based on the diagnosis data for ten times which have been stored in the evacuation areas therefor.

At step 340, the diagnosis pulses OA (i) ($1 \leq i \leq 24$) are all outputted parallel at the same time from the first diagnosis pulse output means 110A through the inverter (b) to the B-system check means (second check means) composed of the photo couplers 30, 40 and the like. As the second check means, there are parallel provided twenty-four pairs each including the pair of the photo couplers 30 and 40. Since electric current to an LED provided in the B-system photo coupler 40 in FIG. 2 for example is interrupted temporally upon the parallel outputting of the diagnosis pulses, electric current to an LED provided in the photo coupler 30 is also interrupted temporally. That is, the interruption like this takes place at all of the aforementioned twenty-four pairs.

The same processing as the aforementioned step 740 is executed at step 350. However, of course, the evacuation areas for the input data are provided separately. The abnormality judgment at step 380 can be carried out based on the diagnosis data for ten times which have been stored respectively in these evacuation areas and the diagnosis data for ten times which have been stored respectively in the evacuation areas at the aforementioned step 335. That is, steps 360 through 364 are those steps for realizing the control which repetitively executes the aforementioned storing processing of the input data through ten times.

Thereafter, at step 380, the respective response signals IA (i) ($1 \leq i \leq 24$) are checked to make a judgment of abnormality if any one of the input signals IA (i) ($1 \leq i \leq 24$) is all zero over the consecutive ten times, that is, if it is detected even at one place that electric current is improperly cut off by the A-system check means (first check means).

Then, when the abnormality is detected, the subroutine for the issuance of the emergency safety stop order is called up at step 390, whereupon all the processing of the present program 300 are terminated to return the control to the caller.

Figure 8:
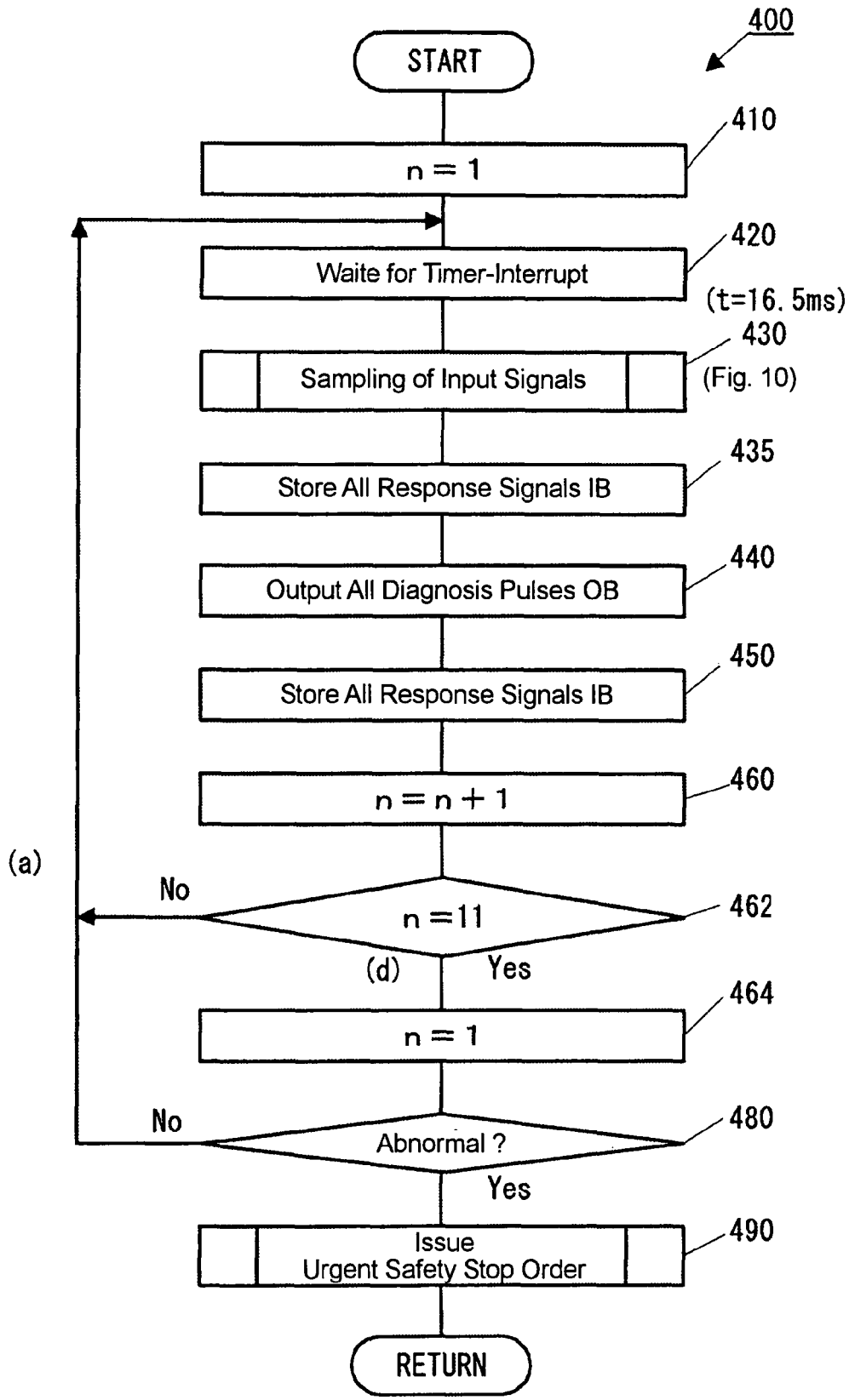
FIG. 8 is a flow chart exemplifying the procedure for a self-diagnosis (B) executed by the microcomputer 100B.

As shown in FIG. 3-A and FIG. 8, one millisecond behind the execution time of the program 300 in FIG. 7, the program 400 in FIG. 8 is executed to be processed in the same manner as the program 300. The independencies of the self-diagnosis (A) and the self-diagnosis (B) can be secured by sufficiently shifting the execution time of the program 400 from that of the program 300. That is, during each self-diagnosis (A) or (B), it does not take place that the diagnosis pulses are crossed each other.

The cycle at which the repetitive control passes through the respective cyclic points (d) shown in FIGS. 7 and 8 becomes $10\Delta T=180$ milliseconds. That is, the cycle at which the step 364 in the execution of the self-diagnosis (A) or the step 464 in the execution of the self-diagnosis (B) (each diagnosis cycle (T) for the self-diagnosis (A) and the self-diagnosis (B)) is executed becomes 0.18 seconds, as understood also from FIG. 6. This time length is within a delay time which a worker is supposed to take in depressing the emergency stop button for system stop at an emergency time for example and thus, can be the length which is sufficiently within a permissible range.

In the event of an emergency state exemplified in FIGS. 1-A and 1-B for example, the control method like this makes it possible to detect such a state quickly and to secure the safety.

Hereafter, with reference to FIGS. 9 through 13, exemplification will be made regarding the execution procedure which executes the aforementioned input signal sampling processing and the detection processing for the non-coincidence between the duplexed input signals at a high speed.

Sampling and Judgment of Input Signal Group

Figure 9:
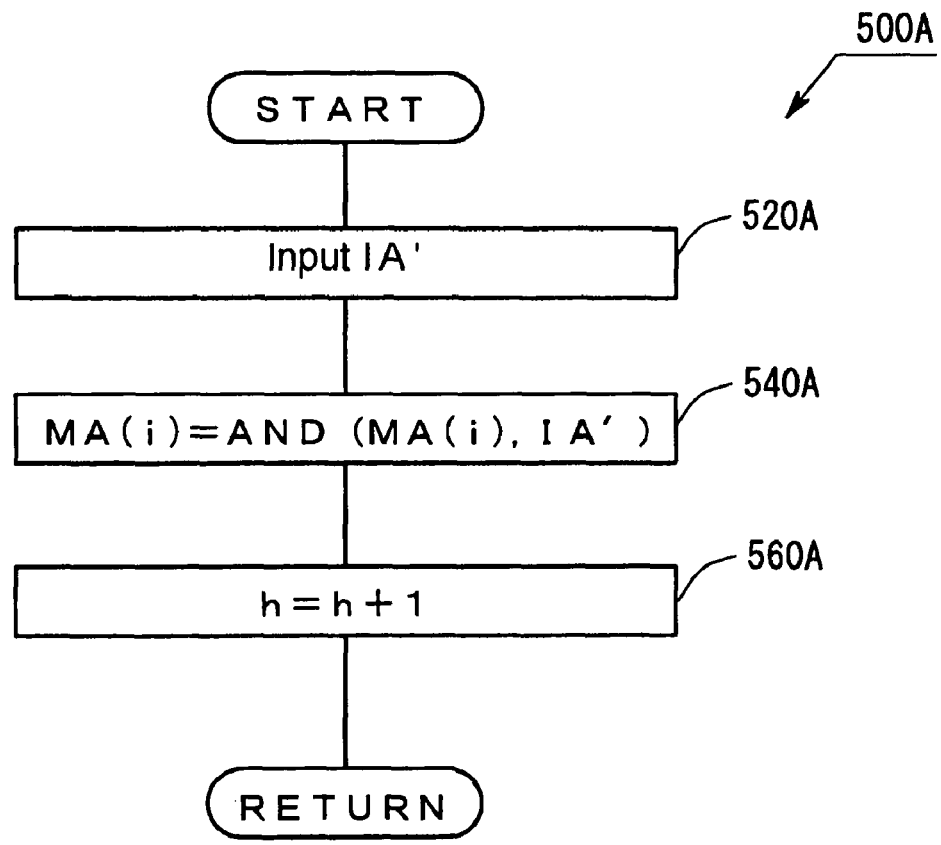
FIG. 9 is a flow chart exemplifying the execution procedure for the sampling (A-system) of input signals.

FIG. 9 is a flow chart exemplifying the execution procedure for input signal sampling (A-system). First input signal group IA' are inputted at the first step 520A of this program 500A. The first input signal group IA' are outputted to the microcomputer 100A from the same inverter (a) (input section in FIG. 2) as for the response signals IA. The first input signal group IA' are not the response signals to the diagnosis pulses OB, but are the input signals inputted to the input circuits 200 relating to the A-systems of the respective external input devices, so that respective bits thereof correspond respectively to the respective external input devices (twenty-four units in total). The inputted first input signals group IA' are held in a one-word area having thirty-two bits for one word, in the form of right justification. The higher eight bits are set to be always zero or are disregarded.

Next, at step 540A, predetermined twenty-four bit data in a similar one-word area MA(i) are respectively brought into the calculations of logical product (AND) with the aforementioned first input signal group IA' on a bit-by-bit basis. Here, the integers (i) are arguments for an array MA and are sepa-rately allocated for respective times (t) within the base control cycle $\Delta T$, as shown in the figure. Then, the results of the logical calculations are held in the one-word area MA(i). As the initial values in the one-word area MA(i), "0" is set at each of the left eight bits, while "1" is set at each of the right twenty-four bits.

At step 560A, the number of times the step 540A has been executed is counted by a control variable (h).

In accordance with these procedures, where an input signal which became zero even once during the five-time samplings of the first input signal group IA', the value of a corresponding bit in the one-word area MA(i) is held by the action of the logical product calculation (AND command) to be zero consecutively thereafter. That is, the input signal which became zero (i.e., OFF state) even once during the five-time samplings is thereafter stored to be zero consecutively in the one-word area MA(i). In this way, it becomes possible to store the results of the aforementioned five-time diagnoses in the one-word area MA(i) in the form condensed on the bit-by-bit basis.

Figure 10:
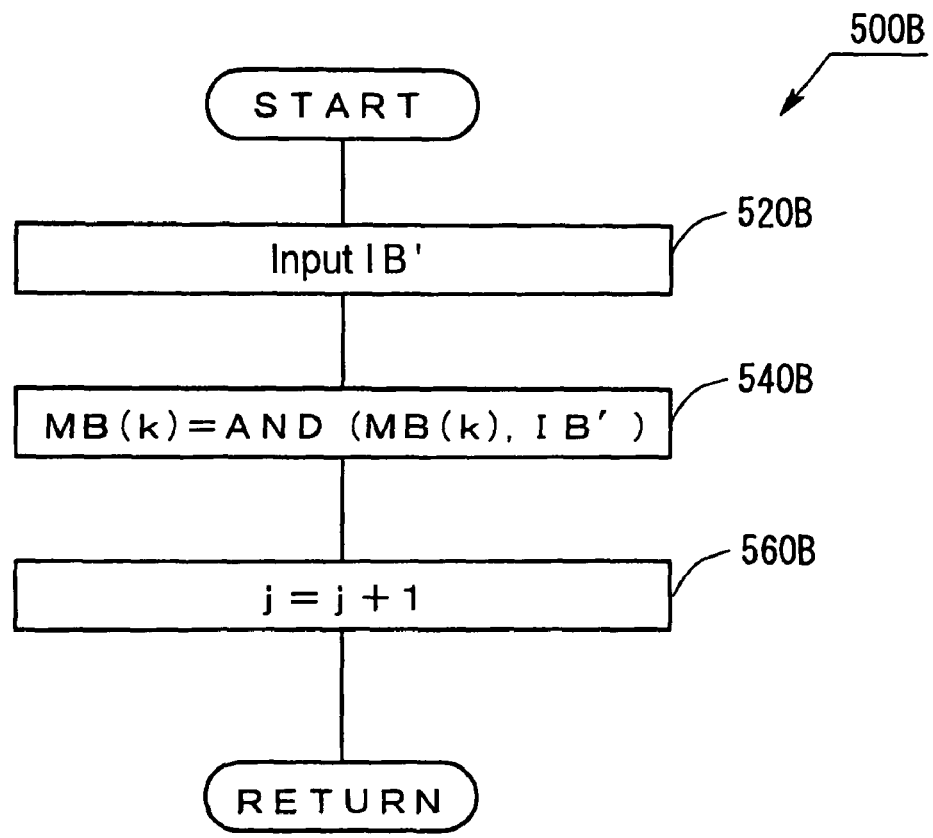
FIG. 10 is a flow chart exemplifying the execution procedure for the sampling (B-system) of input signals.

FIG. 10 is a flow chart exemplifying the execution procedure for input signal sampling (B-system). Although being analogous to the aforementioned program 500A, this program 500B is slightly different therefrom in the definitions of arguments (i) and (k) in dependence on the timings at which it is called up, as understood from FIG. 3-A and FIGS. 7 through 9. For example, as shown in the row for "Input Sampling" in FIG. 3-A and FIG. 10, the values of the second input signal group IB' are sampled at each of three times including $t=13.5$ milliseconds, 16.5 milliseconds and 17.5 milliseconds within the same control cycle. As a result that this is repeated through five cycles, sampled data for fifteen times in total are divided and stored in three storage areas MB(1), MB(2) and MB(3) for the respective times (t) in the form condensed through the aforementioned logical calculations.

Figure 11:
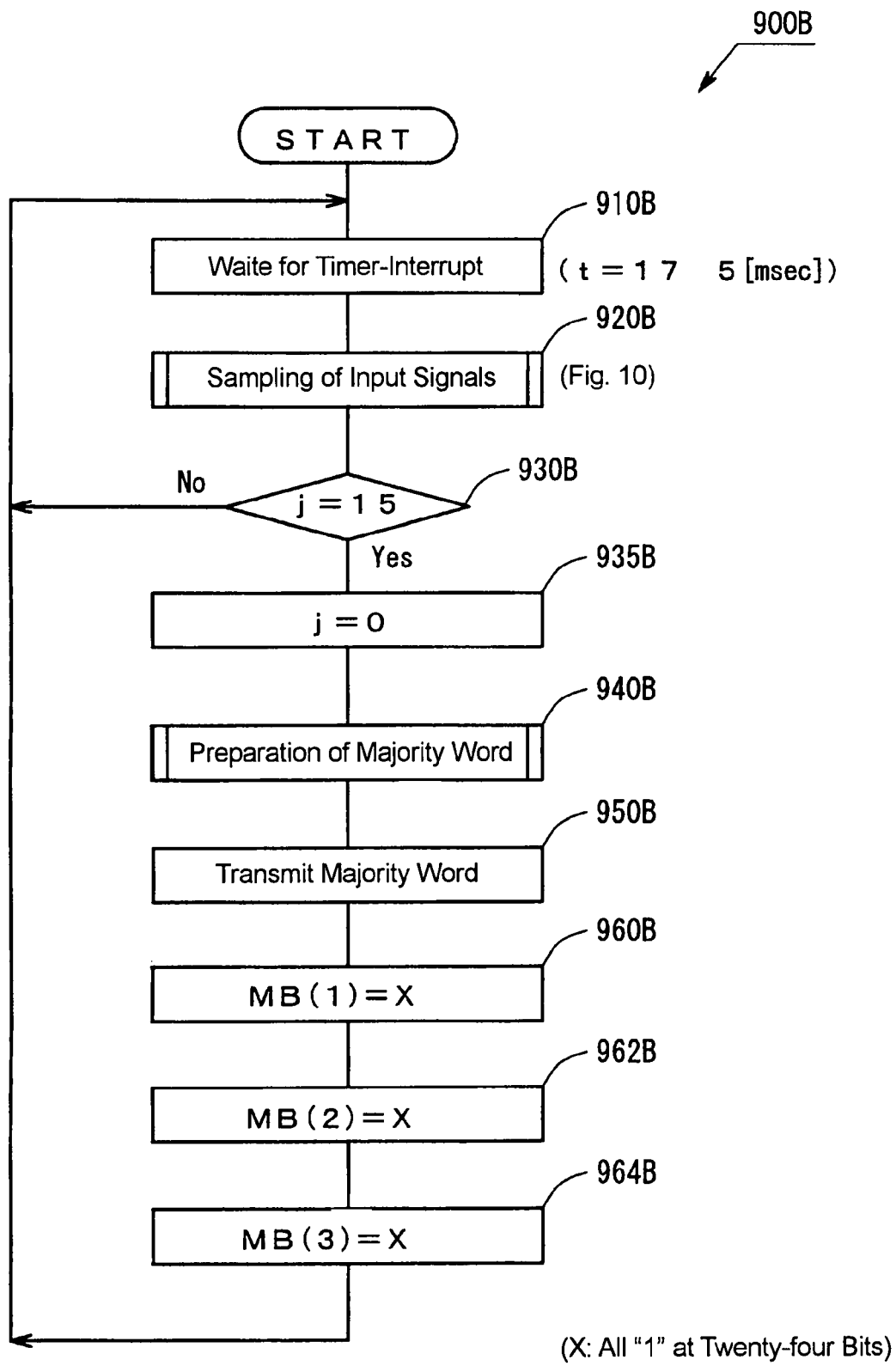
FIG. 11 is a flow chart exemplifying the execution procedure for a majority processing (B-system)

FIG. 11 is a flow chart exemplifying the execution procedure for majority processing (B-system). Under this program 900B, after the sampled data for the fifteen times in total are divided as aforementioned into diagnosis data, each including those for five times (five control cycles), for the three storage areas MB(1), MB(2) and MB(3) for the respective times (t) and are stored in the respective storage areas MB(k) through the logical product calculations at step 540B, the majority between respectively corresponding bits of the three words MB(1), MB(2) and MB(3) is decided at step 940B with respect to each of the twenty-four bits respectively corresponding to the external input devices.

Subsequently, at step 950B, a majority word MB which holds the results of the majority for respective bits is transmitted from the microcomputer 100B to the microcomputer 100A. At those steps subsequent to step 960B, the initial values (X) for the aforementioned three words MB(1), MB(2) and MB(3) are set again. As mentioned earlier, the initial values (X) are set to take "0" at each of the left eight bits and "1" at all of the right twenty-four bits.

Figure 12:
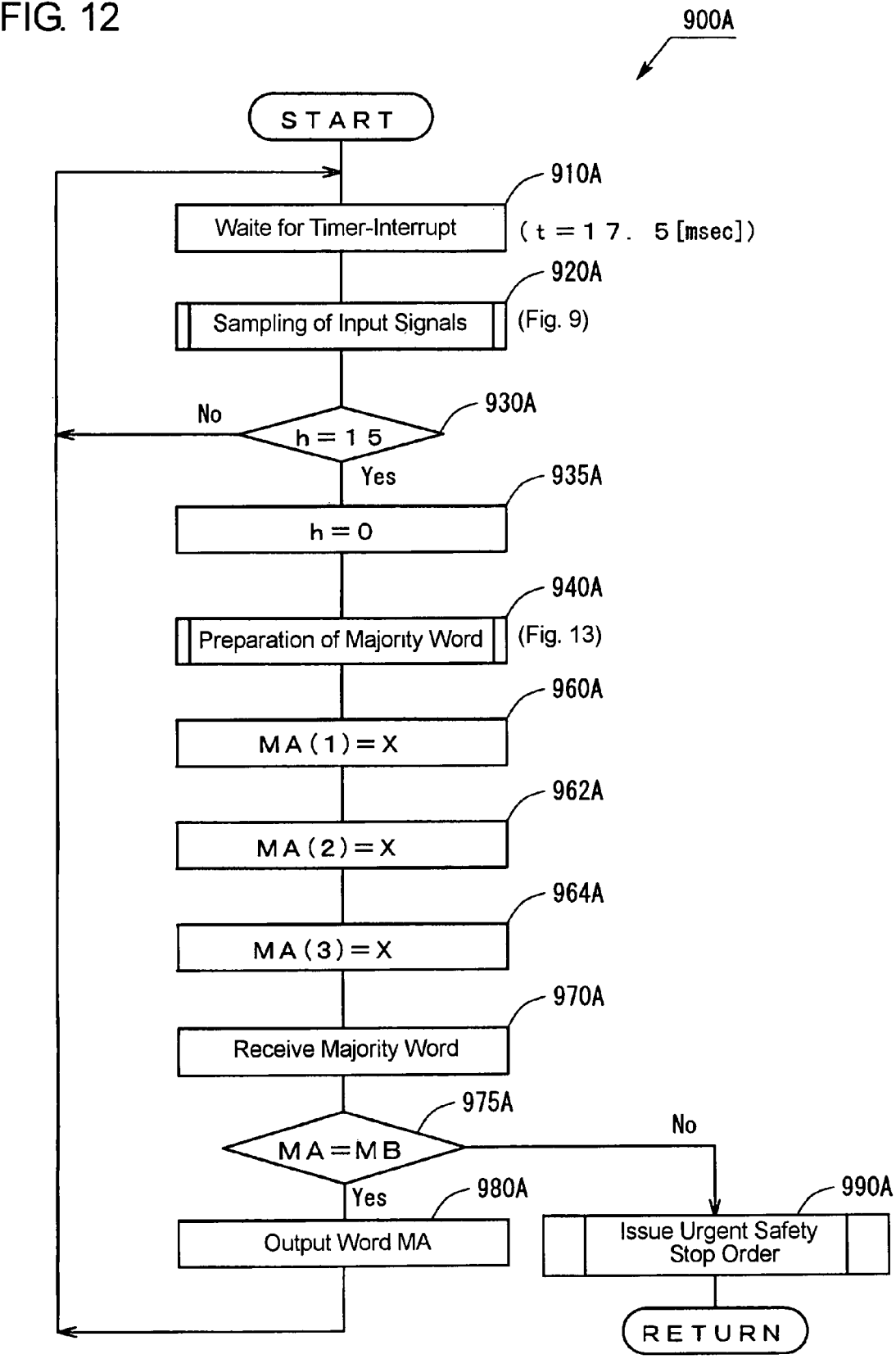
FIG. 12 is a flow chart exemplifying the execution procedure for non-coincidence detection.

FIG. 12 is a flow chart exemplifying the execution procedure for non-coincidence detection. This program 900A is configured to have steps 910A through 970A which are almost the same as those of the aforementioned program 900B, symmetrically with the program 900B. However, in place of transmitting the majority word MB at step 950B (FIG. 11), the program 900A receives the majority word MB from the microcomputer 100B at step 970A (FIG. 12). The transmission and reception may be realized by sharing a primary storage device or may be realized by the use of a bus or the like.

At step 975A of this program 900A, judgment is made of whether or not the majority word MA prepared at step 940A coincides with the majority word MB prepared at step 940B. As a result, the control is moved to step 980A if the both words are in coincidence, but to step 990A if not in coincidence. At step 980A, either of the majority word MA and the majority word MB is transmitted (outputted) to a conventional sequencer (sequence controller or sequential circuit; not shown) which is in connection with the microcomputer 100A.

On the other hand, when the majority word MA and the majority word MB do not coincide, the emergency safety stop order is issued at step 990A to execute a predetermined emergency safety stop operation. Usually, the emergency safety stop order is outputted as a predetermined stop signal to respective stop means which are connected to a safety PLC output port provided in the microcomputer 100A or 100B. As these stop means, there may be connected emergency stop brakes, power breakers, motors or the like.

Figure 13:
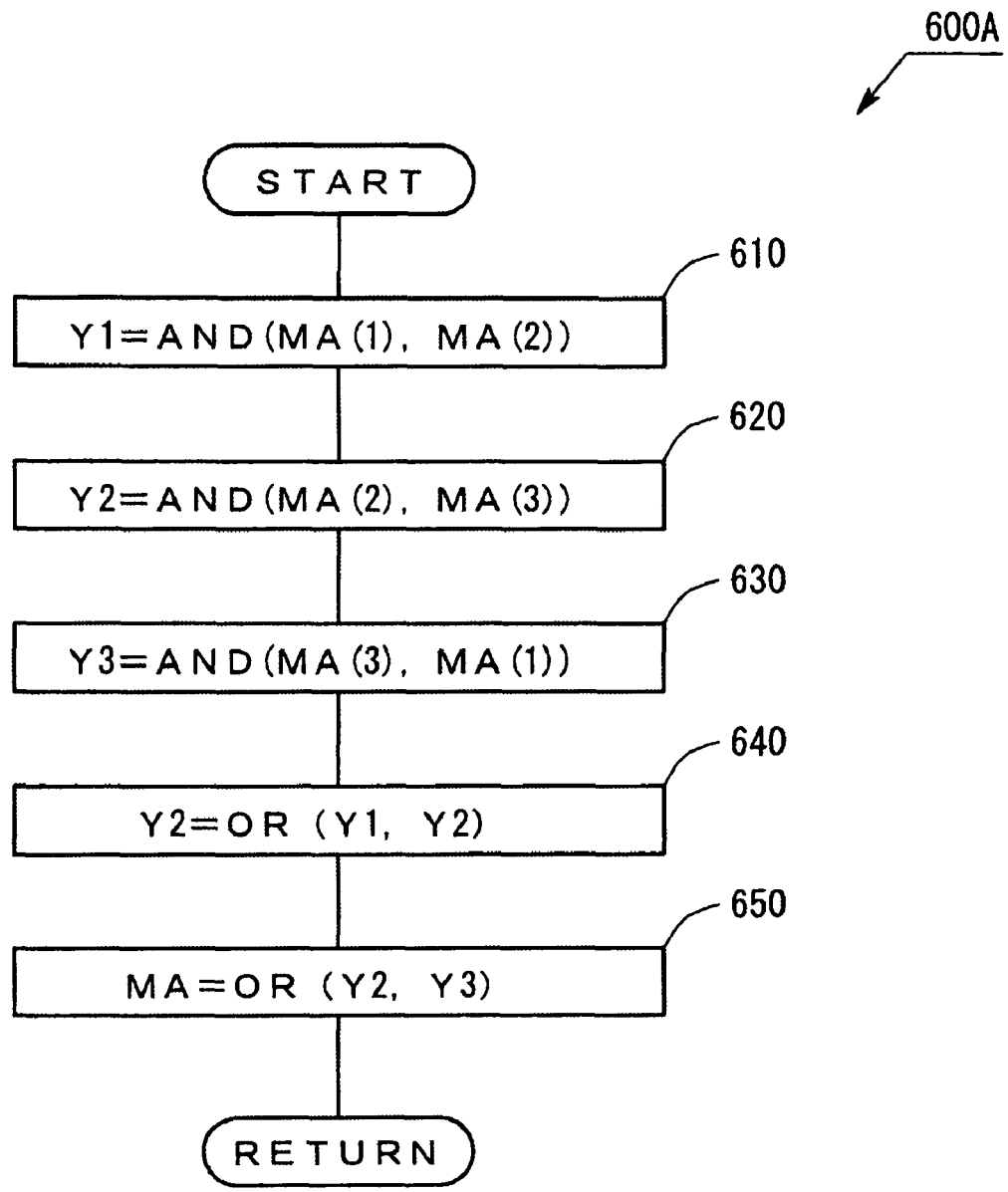
FIG. 13 is a flow chart exemplifying the preparation procedure for a majority word (MA)

FIG. 13 is a flow chart exemplifying the preparation procedure for the aforementioned majority word MA. Although this program 600A is configured to prepare the majority word MA for the A-system, it is possible to execute similar logic calculations also in the B-system. This program 600A is a subroutine which is called up at the aforementioned step 940A to be executed. Of course, it may be configured in the form of an extractable macro.

Under this program 600A, logical products of the aforementioned words MA(1) and MA(2) which are obtained under the program 500A are calculated and are stored as variables Y1. Of course, the logical products are executed between the respective bits corresponding to each other.

In the same manner, also at steps 620 and 630, logical products of the words MA(2) and MA(3) and logical products of the words MA(3) and MA(1) are stored respectively as variables Y2 and Y3.

At step 640, logical sums of the variables Y1 and Y2 calculated here are calculated to renewedly store the calculation result as the variables Y2.

At next step 650, logical sums of the variables Y2 and Y3 calculated here are further calculated to store the calculation result as the majority word MA.

According to the aforementioned processing, it is possible to calculate a desired majority word MA at a high speed through the aforementioned five steps 610 through 650 (by five logical operation commands).

In accordance with the aforementioned processing methods shown in FIGS. 9 through 13, the processing executed at the upper row in FIG. 3-A, that is, the input signal sampling processing and the non-coincidence detection processing to be executed based on the sampled data can be executed each at a high speed through the simple and high-speed logical operations.

Other Modifications

The present invention is not limited to the aforementioned embodiment and may be modified as will be exemplified hereafter. The present invention can achieve the effects based on the operation of the present invention even in the modifications and applications described hereafter.

First Modification

For example, in the self-diagnosis (FIG. 7) in the aforementioned first embodiment, all the bits of the response signal IA are stored every time respectively in the predetermined evacuation areas at step 350. However, in dependence on the judgment method at the subsequent step 380, it is not necessarily required to do so.

The step 540A (FIG. 9) and the step 540B (FIG. 10) are configured by utilizing a judgment criterion that if a signal of the value "0" (OFF signal indicative of the interruption of the input) is inputted even once of the five times, that bit is judged to be "0". For example, it may be the case that by utilizing the judgment criterion adequately, it becomes possible to dynamically execute the most part of the judgment processing, so that the evacuation areas for reference data (input signals) can be suppressed to the minimum.

Second Modification

Further, although in the foregoing first embodiment, the duplexing of the input circuit has been practiced with the two systems separately including the A-system and the B-system, the multiplexing of the input circuit may be realized in a triplexing form or may be realized in a quadruplexing form. For example, where the input circuit is triplexed by three systems including the A-system, the B-system and the C-system, it becomes possible to apply the majority theory to the non-coincidence detection processing method in the non-coincidence detection means or to dynamically reduce the triplexed system to the duplexed system where an abnormality occurs in one system only. Therefore, it becomes also possible to greatly reduce the chances for the system stops.

By constructing the means in the present invention properly, it is possible to lead the operation of the present invention regardless of the multiplexing of these means. That is, the substantive operation principle of the present invention does not relate directly to the degree of multiplex in implementing the multiplexing of the system.

Third Modification

Further, in the foregoing first embodiment, both of the self-diagnosis (A) and the self-diagnosis (B) are executed at the different timings. However, even where there is used a mode in which either one only of the self-diagnosis (A) and the self-diagnosis (B) is executed, it is possible to obtain the effect of the short-circuit detection by the action of the aforementioned self-diagnosis (A) or (B) in the foregoing first embodiment.

This is because as understood from FIGS. 1-A and 1-B, the ordinary short-circuit fault is detectable by either of the self-diagnosis (A). and the self-diagnosis (B) thanks to the symmetry of the input circuit, so that the omission of either one does not result in any particular difficulty.

However, for the reason that the self-diagnosis (A) and the self-diagnosis (B) are controllable by almost the same program 700/800, that it is possible or easy to secure within one control cycle the period for executing the diagnoses at different times, that there are circumstances to secure the certainty and reliability in the processing by duplexing the processing concerned, or that the temporal storage device has superabundance in capacity, it may of course be not a few cases that it is better to duplex the processing concerned (the aforementioned self-diagnosis).

On the other hand, it may also be the case that the aforementioned base control cycle ΔT can be further shortened by optimally designing the control period of time with omission of, e.g., the self-diagnosis (B). In this case, advantage can be obtained in such a respect that the diagnosis cycle (T) or the like can be shortened or that it becomes unnecessary to prepare and handle the program 400.

Fourth Modification

Further, although the foregoing first embodiment rests on the premise that each of the individual input circuits relating to the respective external input devices has been duplexed, it is not necessarily required to duplex respective input signals from all the external input devices. That is, with respect to devices (external input devices) which have no risk of leading to the occurrence of any emergency situation for example, it is sufficient to transmit input signals to input circuits in a single mode. Further, it is needless to say that the execution of a non-coincidence detection processing such as, e.g. that in the aforementioned first embodiment is not required for any input signal which is not duplexed like this.

Industrial Applicability

The present invention is greatly useful in securing at a high level the reliability on input signals inputted to a programmable controller (PLC), the certainty in the processing for those input signals and the system safeness which is to be secured based thereon, and hence, can be effectively utilized in sequence control or the like for the operations of robots, machine tools and peripheral devices thereof.

Further, where the aforementioned external input devices are supposed to include variable sensors (detection devices), information processing devices and the like, the present invention can be utilized also in an auto cruise system for a motor vehicle, whereby it may be the case that a safer auto cruise system can be constructed.

The invention claimed is:

1. A programmable controller wherein a plurality of external input devices and a processing device for processing an input signal group inputted from the external input devices are multiplexed by a plurality of systems and wherein upon coincidence between the input signal groups in all the systems, correct input signals are judged to have been inputted while upon non-coincidence therebetween, an abnormality stop processing is performed, wherein the processing device in one system comprises:
diagnosis pulse output means for parallel outputting a diagnosis pulse group to the processing device in another system at a timing unique to the one system;
check means for inputting thereinto diagnosis pulses outputted from the diagnosis pulse output means in the another system and for interrupting transmission of the input signal group for a period of the diagnosis pulses only; and
abnormality judgment means for executing an abnormality stop processing when a signal of the input signal group changes in response to the outputting of the diagnosis pulses from the diagnosis pulse output means in its own system,
wherein the signal processing device in the one system includes: serial diagnosis pulse output means for serially outputting serial diagnosis pulses for each input terminal to a processing device in another system; and pulse check means for inputting serial diagnosis pulses that are serially outputted for each input terminal from serial pulse output means of the processing device in the another system and for making the judgment of abnormality to execute the abnormality stop processing when an input signal does not change in correspondence to the period of the serial diagnosis pulses.

2. The programmable controller described in claim 1, wherein:
the abnormality judgment means makes a judgment of abnormality and performs an abnormality stop when a signal from the same input terminal of the input signal group consecutively changes a predetermined number of times.

3. The programmable controller described in claim 1, wherein:
a first abnormality judgment means makes the judgment of abnormality to perform an abnormality stop when a signal from the same input terminal of the first input signal group consecutively changes a predetermined number of times; and
a second abnormality judgment means makes the judgment of abnormality to perform the abnormality stop when a signal from the same input terminal of the second input signal group consecutively changes a predetermined number of times.

4. The programmable controller described in claim 1, wherein the check means comprises:
a first photo coupler for inputting an input signal; and
a second photo coupler composed of a photo transistor connected in series to a light emitting diode of the first photo coupler and a light emitting diode for generating an optical signal to the photo transistor of the second photo coupler upon receiving the diagnosis pulse.

5. A programmable controller constructed to be duplexed by a first input terminal group for inputting a first input signal group which is outputted from an external input device group each constructed to be duplexed; a first signal processing device for processing the first input signal group inputted to the first input terminal group; a second input terminal group for inputting a second input signal group outputted from the external input device group; and a second signal processing device for processing the second input signal group inputted to the second input terminal group, wherein a correct signal is judged to have been inputted when a first input signal being one element of the first input signal group coincides with a second input signal paired with first input signal while an abnormal processing is performed in the case of non-coincidence, wherein the first signal processing device comprises:
first diagnosis pulse output means for parallel outputting a first diagnosis pulse group to the second signal processing device;
first check means for parallel inputting thereinto a second diagnosis pulse group outputted from the second signal processing device and for interrupting transmission of the first input signal group for a period of the second diagnosis pulse group only; and
first abnormality judgment means for making a judgment of abnormality to execute an abnormality stop processing when the first input signal group changes in response to the outputting of the first diagnosis pulse group from the first diagnosis pulse output means, and wherein the second signal processing device comprises:
second diagnosis pulse output means for parallel outputting the second diagnosis pulse group to the first check means at a timing which is different from the outputting of the first diagnosis pulse group;
second check means for parallel inputting thereinto the first diagnosis pulse group outputted from the first diagnosis pulse output means and for interrupting transmission of the second input signal group for a period of the first diagnosis pulse group only; and
second abnormality judgment means for making the judgment of abnormality to execute the abnormality stop processing when the second input signal group changes in response to the outputting of the second diagnosis pulse group from the second diagnosis pulse output means.

6. The programmable controller described in claim 5, wherein the first signal processing device comprises:
first serial diagnosis pulse output means for serially outputting first serial diagnosis pulses to the second check means for each input terminal; and first pulse check means for inputting thereinto second serial diagnosis pulses that are serially outputted from the second signal processing device to the first check means for each input terminal and for making the judgment of abnormality to execute the abnormality stop processing when a first input signal does not change in correspondence to the period of the second serial diagnosis pulses, and wherein the second signal processing device comprises:

second serial diagnosis pulse output means for serially outputting the second serial diagnosis pulses to the first check means for each input terminal; and second pulse check means for inputting thereinto the first serial diagnosis pulses that are serially outputted from the first serial diagnosis pulse output means to the second check means for each input terminal and for making the judgment of abnormality to execute the abnormality stop processing when a second input signal does not change in correspondence to the period of the first serial diagnosis pulses.

7. The programmable controller described in claim 5, wherein the first check means comprises:

a first photo coupler for inputting the first input signal; and a second photo coupler composed of a photo transistor connected in series to a light emitting diode of the first photo coupler and a light emitting diode for generating an optical signal to the photo transistor of the second photo coupler upon receiving a second diagnosis pulse, and wherein the second check means comprises:

a third photo coupler for inputting the second input signal; and a fourth photo coupler composed of a photo transistor connected in series to a light emitting diode of the third photo coupler and a light emitting diode for generating an optical signal to the photo transistor of the fourth photo coupler upon receiving a first diagnosis pulse.

\* \* \* \* \*